March 20, 1973 A. B. ETTLINGER 3,721,757

METHOD AND APPARATUS FOR AUTOMATICALLY EDITING TELEVISION INFORMATION

Filed Feb. 8, 1971 12 Sheets-Sheet 1

INVENTOR.
ADRIAN B. ETTLINGER
BY M. Novack
ATTORNEY

INVENTOR
ADRIAN B. ETTLINGER
BY M. Novack
ATTORNEY

INVENTOR.
ADRIAN B. ETTLINGER
BY
M. Novack
ATTORNEY

INVENTOR
ADRIAN B. ETTLINGER
BY M. Novack
ATTORNEY

March 20, 1973 A. B. ETTLINGER 3,721,757

METHOD AND APPARATUS FOR AUTOMATICALLY EDITING TELEVISION INFORMATION

Filed Feb. 8, 1971 12 Sheets-Sheet 5

INVENTOR
ADRIAN B. ETTLINGER
BY M. Novack
ATTORNEY

INVENTOR
ADRIAN B. ETTLINGER
BY M. Novack
ATTORNEY

INVENTOR
ADRIAN B. ETTLINGER
BY M. Novack
ATTORNEY

INVENTOR.
ADRIAN B. ETTLINGER
BY M. Novack
ATTORNEY

March 20, 1973 A. B. ETTLINGER 3,721,757

METHOD AND APPARATUS FOR AUTOMATICALLY EDITING TELEVISION INFORMATION

Filed Feb. 8, 1971 12 Sheets-Sheet 9

INVENTOR.
ADRIAN B. ETTLINGER
BY M. Novack
ATTORNEY

INVENTOR.
ADRIAN B. ETTLINGER
BY M. Novack
ATTORNEY

INVENTOR.
ADRIAN B. ETTLINGER
BY M. Novack
ATTORNEY

March 20, 1973 A. B. ETTLINGER 3,721,757

METHOD AND APPARATUS FOR AUTOMATICALLY EDITING TELEVISION INFORMATION

Filed Feb. 8, 1971 12 Sheets-Sheet 12

INVENTOR.
ADRIAN B. ETTLINGER

BY M. Novack

ATTORNEY 3,721,757

METHOD AND APPARATUS FOR AUTOMATICALLY EDITING TELEVISION INFORMATION

Adrian B. Ettlinger, Hastings-on-Hudson, N.Y., assignor to Columbia Broadcasting System, Inc.
Filed Feb. 8, 1971, Ser. No. 113,429
Int. Cl. G11b *27/02, 27/32;* H04n *5/78*
U.S. Cl. 178—6.6 A 31 Claims

ABSTRACT OF THE DISCLOSURE

An automatic editor-controllable system for selecting excerpts from a source of electronic picture information and forming a program representative of the sequence of the excerpts. Means are provided for storing the picture information signals in a predetermined order, each frame of the picture information having an address associated therewith. First and second reading means are provided for simultaneously reading out picture information signals from two editor-selected regions of the stored picture information. First and second display means coupled to the reading means are adapted to simultaneously display to the editor the outputs of the reading means. Switching means couple the first and second reading means to the first and second display means. Means are provided for sensing and storing the addresses with the two regions corresponding to an editor-selected transition point as between the two regions. The stored addresses corresponding to editor-selected transition points constitute a "program" of excerpts which can later be utilized to form a final assembled program on an ultimate storage media. In a preferred embodiment of the invention the addresses corresponding to editor-selected transition points are stored in program operable computing means, the computing means generating digital signals which are a function of the addresses. Control circuits means responsive to the digital signals are provided for actuating the first and second reading means to read out in a real time the sequence of excerpts constituting the formed program. This real time readout or "rehearse" is accomplished by viewing the stored picture information, actual splicing or re-recording not being required.

BACKGROUND OF THE INVENTION

This invention relates to television editing and assembly systems and, more particularly, to an improved apparatus and method for automatically editing television information stored on a plurality of storage devices, for enabling essentially immediate review of the results of the editing decisions, and for assembling the edited information on an ultimate storage medium.

In the field of television broadcasting, video tape has generally become recognized as a most advantageous medium on which to storage television broadcast programs and, for some years, the use of magnetic tape as a major production medium has been an attractive goal to broadcasters, producers, and production houses. Video tape has a number of advantages for production usage, including good technical quality, simplicity of handling, and, if used properly, low cost. It has the further advantages of instant replay of recorded material, good color fidelity, low noise levels, and compatibility with the electronic television medium. In spite of these advantages, however, magnetic tape has not supplanted film as a production medium, primarily because of the difficulty in editing the recorded information. The motion picture film editor is able to examine the film on a frame-by-frame basis, with completely compatible readout, to zero speed. Obviously, the editor cannot see the information recorded on magnetic tape without a reproducing device, and then it is only when the relative velocity between tape and reproducing head is very close to the nominal value that the picture becomes usable.

It is evident, then, that video-tape editing is a dynamic operation rather than a static one, and for this reason automatic tape editing becomes necessary if the industry is to benefit from the use of tape, as a low-cost hi-fidelity production medium.

For a number of years, manual editing of television tape has been used, involving either physical splicing (cutting) or electronic splicing (re-recording) techniques. Both methods are slow, costly, and incapable of the necessary accuracy and repeatability for major production usage. Also, these methods essentially preclude the editor from modifying an editing decision, once made.

The foregoing difficulty of editing has led to the development of automatic video tape editing and splicing systems, a representative one of which, hereinafter referred to as the NHK system, is described in volume 76, No. 3, pp. 169–176 of the March 1967 edition of the Journal of the Society of Motion Picture and Television Engineers and is entitled "An Automatic Video Tape Editing Splicing System Using A Process Computer." As described in this article the output signals of studio cameras are recorded on an original tape which provides the address signals consisting of coded time signals for minutes, seconds and frames over the entire length of the tape. A second video tape is recorded, either at the same time as, or from the original tape, on a helical scan video tape recorder, with exactly the same address signals, which serve as location cues. Only the helical scan tape is used for editing, which is accomplished by pushing "cut-in" and "cut-out" buttons at the appropriate scenes, in normal, still or slow-motion viewing on a single monitor. With these push button operations, the editor's decisions are transferred to the drum memory of a computer.

The original tape and a master tape are later run in parallel on two separate video tape recorders. The record of the original, at the appropriate places and sequence recorded in the computer, is dubbed automatically onto the master. The NHK system provides many advantages over previous editing systems, which advantageous features are summarized in the above-referenced article. However, in this system editing decisions are made largely "on the fly," both at "exit" from one sequence to "entry" of the next sequence, without opportunity to compare the "exit" and "entry" scene as they will appear in the ultimate master, and, as acknowledged in the article, with the NHK system the editor cannot see the results of his editing decisions immediately after completion of the editing (as in the case of film, for example) but must play through the entire assembled master to observe them. If upon viewing, the editor wishes to alter one or more "cuts," it is necessary to erase the information recorded on the master and repeat the above-outlined process.

Accordingly, it is an object of this invention to provide an automatic editing system which provides the editor with a simultaneous presentation of the "exit" frame of one sequence and the "entry" frame of the next successive sequence and means for entering his editing decisions which allows him maximum flexibility to exercise artistic judgment in edit and re-edit, without involving him in complex technological procedures.

Another object of this invention is to provide automatic playback; i.e., "rehearsal" of a number of recorded video excerpts (with accompanying audio) in an editor-selected order, with varying lengths for each excerpt within wide limits.

It is a further object of this invention to provide a completely automatic replay feature whereby an edited reproduction of the stored video information is implemented on a continuous uninterrupted basis.

It is still another object of this invention to provide an automatic editing system in which the editing decisions are presented in a form for later use, if desired, in assemblng the recorded video excerpts.

SUMMARY OF THE INVENTION

Briefly, these and other objects of the invention are accomplished with an automatic editor-controllable system for selecting excerpts from a source of electronic picture information and forming a program representative of a sequence of the excerpts. Means are provided for storing the picture information signals in a predetermined order, each frame of the picture information having an address associated therewith. First and second reading means are provided for simultaneously reading out picture information signals from two editor-selected regions of the stored picture information. First and second display means coupled to the reading means are adapted to simultaneously display to the editor the outputs of the reading means. Switching means couple the first and second reading means to the first and second display means. Means are provided for sensing and storing the addresses within the two regions corresponding to an editor-selected transition point as between the two regions.

In a preferred embodiment of the invention the addresses corresponding to editor-selected transition points are stored in program-operable computing means, the computing means generating digital signals which are a function of the addresses. Control circuit means responsive to the digital signals are provided for actuating the first and second reading means to read out in real time the sequence of excerpts constituting the formed program. This real time readout or "rehearse" is accomplished by viewing the stored picture information, actual splicing or re-recording not being required.

As was indicated, during the editing operation picture information from two editor-selected regions are simultaneously displayed to the editor on first and second display means. These display means preferably comprise a pair of side-by-side monitors. The system has the capability of still-framing the picture information on the two monitors. By still-framing within his selected regions, the editor can carefuly examine the "exit" and "entry" frames of a proposed transition point for artistic quality and effect before making his editing decisions.

The stored addresses corresponding to editor-selected transition points constitute a "program" of excerpts which can later be utilized to form a final assembled program on an ultimate storage medium. Before finalization, however, the editor can freely amend his previous editing decisions by issuing appropriate commands to the computer to add or remove "cuts" from the stored list of editing decisions. Thus it is seen that with the present invention the editor has the combined advantages of immediate review of his editing decisions without loss of flexibility as to amending those decisions.

The specific structure of the embodiments of the present invention vary somewhat with the type of storage and reading means utilized. In the description which follows a system that utilizes a relatively slow-access storage medium such as video tape recorders, is disclosed. Also disclosed is a system which utilizes a fast-access storage medium, such as magnetic disc files.

DESCRIPTION OF THE PREFERRED EMBODIMENTS

Figure 1:
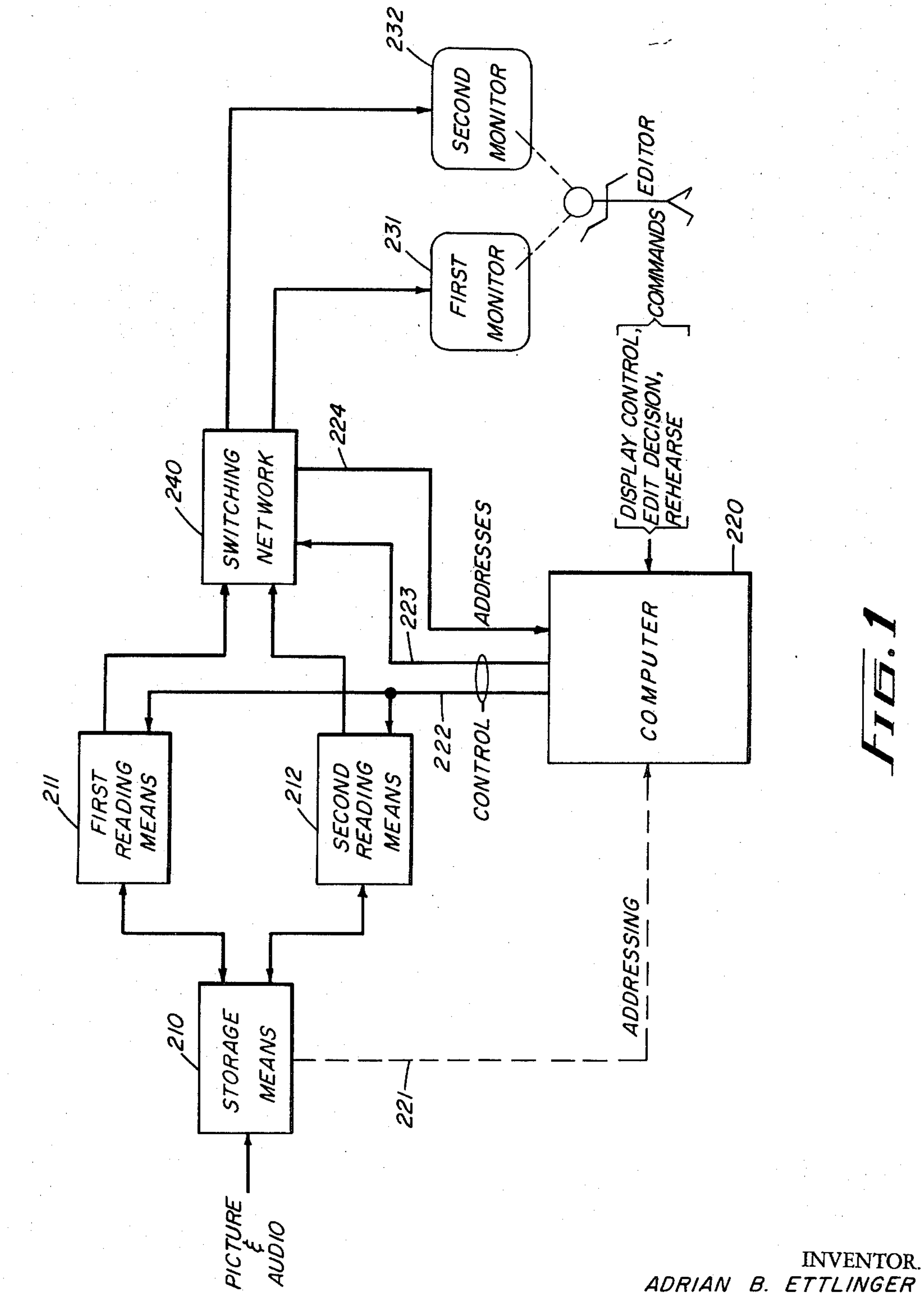
FIG. 1 is a simplified functional block diagram of an automatic editing system in accordance with the invention.

Referring to FIG. 1, there is shown a simplified block diagram which illustrates the basic editing functions of the present invention. Electronic picture input information (and associated audio) is stored, in predetermined order, in a storage means 210. The input picture information consists of a series of frames, each frame stored in the storage means 210 having an address associated therewith. The addresses may consist, for example, of numerical notations which are externally generated and stored with each frame. Alternatively, the physical location of each frame stored within the storage means 210 may be noted by a computer 220, each location constituting an independent address. In either case, the computer 220 is assumed to "know" the address of each frame stored within the means 210 as is indicated by the dashed coupling 221. A first reading means 211 and a second reading means 212 are each coupled to the storage means 210. The reading means 211 and 212 are each operable to read out selected regions of picture information from the storage means 210 for display on a first monitor 231 and a second monitor 232. (It is assumed for the present description that any audio associated with picture information is accordingly stored and processed. Specific treatment of audio signals will be presented in later portions of the specification.) The monitors 231 and 232 are each switchably coupled to both of the reading means by a switching network 240. The monitors are positioned in close proximity for convenient simultaneous view by an editor. Specific regions of picture information to be read out by the reading means 211 and 212 are chosen by the editor.

The editor issues appropriate "control" commands to the computer 220 which, in turn, generates control signals 222 that direct the reading means 211 and 212 to certain addresses within the storage means 210. The computer further generates control signals 223 which actuate the switching network to display the regions of picture information on the specific monitors chosen by the editor. During the reading and display of picture information address signals 224, which may be switched through the network 240, allow the computer 10 to monitor, on a frame-by-frame basis, the address locations of the reading means 211 and 212. When the editor decides that an edit point should occur at a certain transition as between the two regions of picture information being read out, he issues an "edit" command to the computer 210. The computer senses and stores the address or addresses corresponding to the edit point. When the editor wishes to review the picture information program comprising a compilation of his previous editing decisions, he issues a "rehearse" command to the computer 210. The computer effectively sorts the previously stored edit point addresses and generates control signals 222 that direct the reading means 211 and 212 to sequentially read out for display the editor-selected excerpts of picture information. During the rehearse, the editor can, if he wishes, make new editing decisions which alter his previously-compiled program. The final stored list of edit point addresses are later used to form a final program on a separate master storage medium.

Figure 2A:
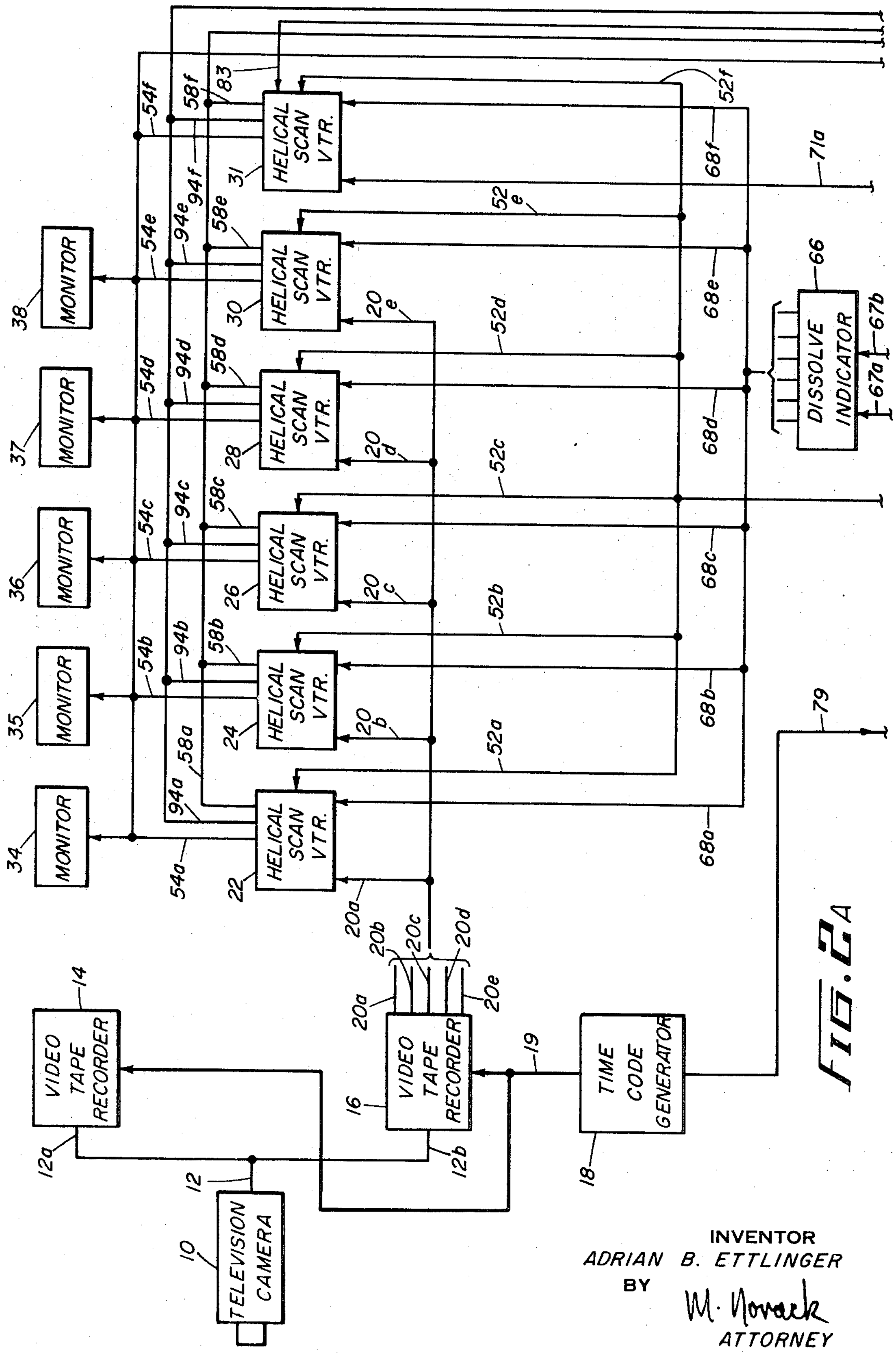
FIGS. 2A and 2B show in schematic form an embodiment of a typical automatic editing system arranged according to the present invention.
Figure 2B:
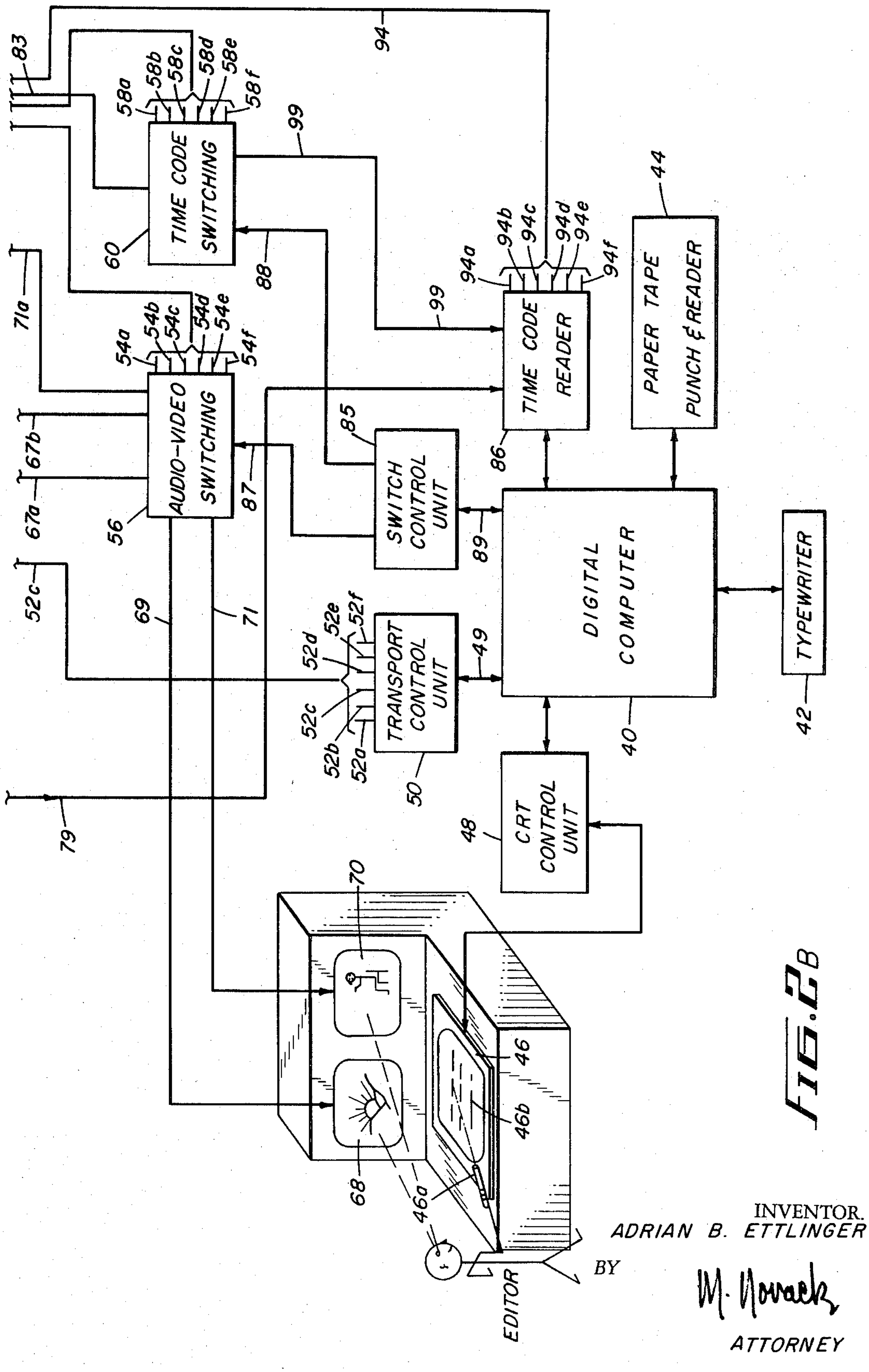

In the illustrative embodiment of the present invention shown in FIGS. 2A and 2B, an automatic editing system includes a color television camera 10, which may be of conventional construction and, accordingly, develops conventional color television signals (NTSC) representative of the information in the scene or object field scanned by the camera 10. The color television signals developed by the camera 10 are supplied concurrently over a conductor 12 and its branch conductors 12*a* and 12*b* to a pair of highband color video tape recorders 14 and 16 which may be, for example, of the Ampex quadruplex VR 2000 type. As will be more apparent hereinafter, the particular editing operation described herein involves the editing of television program material developed by the same camera, i.e., camera 10. Specifically, in this embodiment five "takes" of a particular scene are edited. Where it is desired to edit different "shots" of the same scene taken by five different cameras, for example, each such camera would be coupled to an associated pair of video tape recorders.

At the same time the color television signals are stored on the tapes of the video tape recorders 14 and 16, a time code generator 18 supplies address signals consisting of coded time signals for hours, minutes, seconds and frames of the television signals over the cable 19 to the recorders 14 and 16. In the recorders 14 and 16, the coded address signals are recorded on the cue tracks of the tapes over their entire length in synchronism with the control track signals conventionally recorded on the tape. The time code generator 18 may be of the type made by the Electronic Engineering Company of Santa Ana, Calif. (EECO). This type generator utilizes a binary code to supply groups of pulses representative of time in hours, minutes and seconds. The pulse groups have about one field duration (1/60 second) and lie at one second (30 frames) intervals on the cue track. The EECO generator therefore supplies address information which enables rough searching of the recorded information. For precise searching, a supplemental frame counter is required, as will be explained in greater depth hereinafter. As will be understood, the address signals are recorded on the cue tracks of the tapes in the recorders 14 and 16 only while the tapes on the recorders are in motion and are storing the color television signals supplied by the color television camera 10. Generally, time code readings, viz, hours, minutes and seconds, for the start and finish of each recording on the recorders 14 and 16 are noted by an editor's assistant. However, for possible manpower saving, a video slate may be used.

Coupled to the video tape recorder 16 via a plurality of cables 20*a*, 20*b*, 20*c* and 20*d* and 20*e* are five helical scan video tape recorders 22, 24, 26, 28 and 30. For the sake of illustrative clarity, the cable connnection between the video tape recorder 16 and the helical scan video tape recorders 22, 24, 26, 28 and 30 is shown as a single cable connection. (This technique is used throughout this embodiment where connections to multiple video tape recorders are involoved.) A sixth video tape recorder 31 is also provided and is used as an "overflow" device, as will be apparent hereinbelow. The helical scan video tape recorders may be of conventional construction, such as the Sony Videocorder model BV–120/VTE–2 type. In the Sony Videocorder, video recording is performed in a helical pattern on self-lubricating magnetic tape and the functions of the recorder viz, rewind, fast forward, record, play, stop, slow and still can be controlled locally or remotely. The Sony Videocorder has five record-reproduce heads: video, sync, control track and first and second audio channels; and a full width erase head.

The transfer of the color television video information from the video tape recorder 16 to the helical scan video tape recorders 22, 24, 26, 28 and 30 may be implemented manually in the usual fashion. Each recording or "take" of a particular scene or sequence of events is recorded in a sequential manner on the helical scan video tape recorders 22, 24, 26, 28 and 30. For example, a first take is recorded on the helical scan video tape recorder 22, a second take is recorded on the recorder 24 and so on until as many as five takes have been recorded on the helical scan video tape recorders 22, 24, 26, 28 and 30.

As the video information is transferred from the video tape recorder 16 to the helical scan video tape recorders 22, 24, 26, 28 and 30, the time code signals are also supplied to the helical scan video tape recorders. The time code signals are recorder as audio bandwidth signals on one of the audio tracks of the tapes in each of the helical scan video tape recorders and include a one cycle per second time code signal that can be read out at tape speeds up to twenty (20) times the normal play speeds in either the forward or reverse direction. As above described, the recorded address signals may be utilized for rough searching, viz, minutes and seconds, such that a supplemental frame counter is required to determine precisely the frame address of the recorded video information. The synchronization signal may then be utilized to initiate counting by a frame counter so as to determine or identify each frame of recorded color television information. Coupled to the helical scan video tape recorders 22, 24, 26, 28 and 30 are corresponding monitors 34, 35, 36, 37 and 38, respectively, which display the tape recorded color television information when the rceorders are actuated to the play mode.

Control of the functions of the helical scan video tape recorders is implemented remotely by a general purpose digital computer 40 which may be of the PDP–8 type manufactured by the Digital Equipment Corporation (DEC) of Waltham, Massachusetts. The DEC computer 40 includes as a standard input/output device a teletypewriter 42 having a keyboard for loading instructions into the computer 40 and a printer for producing a hard copy of the information retrieved under program instruction from the memory core of the computer. Also included as an input/output device standard with DEC equipment is a paper tape punch and reader 44 for punching out a computer program on paper tape and for responding to such punch paper tape to control the operation of the computer 40. The devices 42 and 44 are of conventional construction and of the type generally supplied with digital computers.

Also associated with the computer 40 is a CRT terminal 46 and a CRT control unit 48. The control unit 48 provides the interface between the terminal 46 and the computer 40. The CRT terminal 46 and the control unit 48 may be of conventional construction, such as the type made by Computer Communications Inc. of Inglewood, Calif. The Computer Communications SRT terminal 46 includes a light pen 46*a*, identified as a CC–304 light pen which employs a phototransistor detector and includes an interrupt switch, and a television display 46*b* identified as a CC–300 display. The control unit of Computer Communications Inc. is identified as a CC–301 controller.

The light pen 46*a* is used by an operator in conjunction with the display 46*b* to convey instructions to the computer. When the light pen is directed toward the display and light from the display is first detected by the pen, the searching operation of the light pen ceases and the address of the detected light is retained in a light pen address register within the controller unit 48. Characters presented on the display represent a choice of commands which can be given to the computer. A marker appears on the display device which indicates the position to which the positioning of the light pen corresponds. This marker is an intensity illumination of the character background.

To transmit the character position stored in the light pen address register to the computer 40, the interrupt switch on the pen is depressed. This switch activates an interrupt condition within the light pen logic and causes an interrupt code to be transmitted to the computer 40 by the CC–301 controlled (Unit 48). The interrupt code or status word contains a bit which indicates that a light pen interrupt condition exists. Until the status word is read by the computer, the light pen is logically locked out from the computer 40. However, after the light pen address is read by the computer, the marker disappears from the face of the display device and the light pen is again ready to search.

The computer decodes the address in the light pen address register into an instruction which either implements a series of functions within the computer or readies the computer for further instructions to be received from the light pen. It will be noted that by using a Computer Communications Inc. light pen of the above-described type, the operator of the computer can determine whether the character position on which the light pen is positioned corresponds to the instruction which he desires to generate before such instruction is transmitted to the computer. It is only after the operator has addressed a particular instruction and depressed the interrupt switch on the pen that the instruction is decoded by the computer 40 and employed to initiate a sequence of events within the computer. It will be appreciated that while the light pen-controlled terminal described herein is particularly suited to convenient operation of the disclosed editing system, other interface terminals could be utilized if desired.

The computer 40 is coupled via a cable 49 to a transport control unit 50, which again may be of a conventional type, and which provides an interface between the computer 40 and the helical scan video tape recorders 22, 24, 26, 28 and 30 and 31. The transport control unit 50 decodes the instructions generated by the computer 40 and generates control signals which, inter alia, cause movement of the tape on a selected video tape recorder between two predetermined addresses. A plurality of cables **52*a*–52*f* couple the recorder control and address signals from the control unit 50 to the helical scan video tape recorders 22, 24, 26, 28, 30 and 31**, respectively.

The initial phase of the operation of the system of the present invention is identified as the tape control operation and involves an examination of the video information recorded on each of the video tape recorders 22, 24, 26, 28 and 30. By suitable positioning of the light pen on the cathode ray tube of the CRT terminal 46, each helical scan video tape recorder may be addressed and a play instruction generated by the computer 40. As will be understood, all that is required to implement such play function by each of the helical scan video tape recorders is the generation of a single instruction by the CRT terminal 46 and its control unit 48 to address a particular video tape recorder. The same instruction is also decoded by the computer into a play instruction which is then encoded and transmitted to the addressed recorder by way of the transport control unit 50. Specifically, the CRT terminal 46 generates an instruction in the same way as if the control pushbutton switches on the video tape recorders were to be selectively actuated. Accordingly, each of the video tape recorders 22, 24, 26, 28 and 30 can be addressed and all the video information recorded on the tape thereof can be read out and reproduced by each of the associated monitors 34–38. As will become clear, the monitors 34–38 are not the primary monitors utilized by the editor during the editing operation, but they can nonetheless be useful if the editor desires to observe simultaneously the outputs of three or more recorders.

The amplifying logic associated with the video record/reproduce heads and the record/reproduce heads of the first audio channels of the video tape recorders 22, 24, 26, 28, 30 and 31 are coupled via a plurality of cables **54*a*–54*f* to an audio-video switching unit 56. Similarly, the logic associated with the record/reproduce heads of the second audio channels of the video tape recorders 22, 24, 26, 28, and 30 and 31 are coupled via a plurality of cables 58*a*–58*f* to a time code switching unit 60**.

Figure 3A:
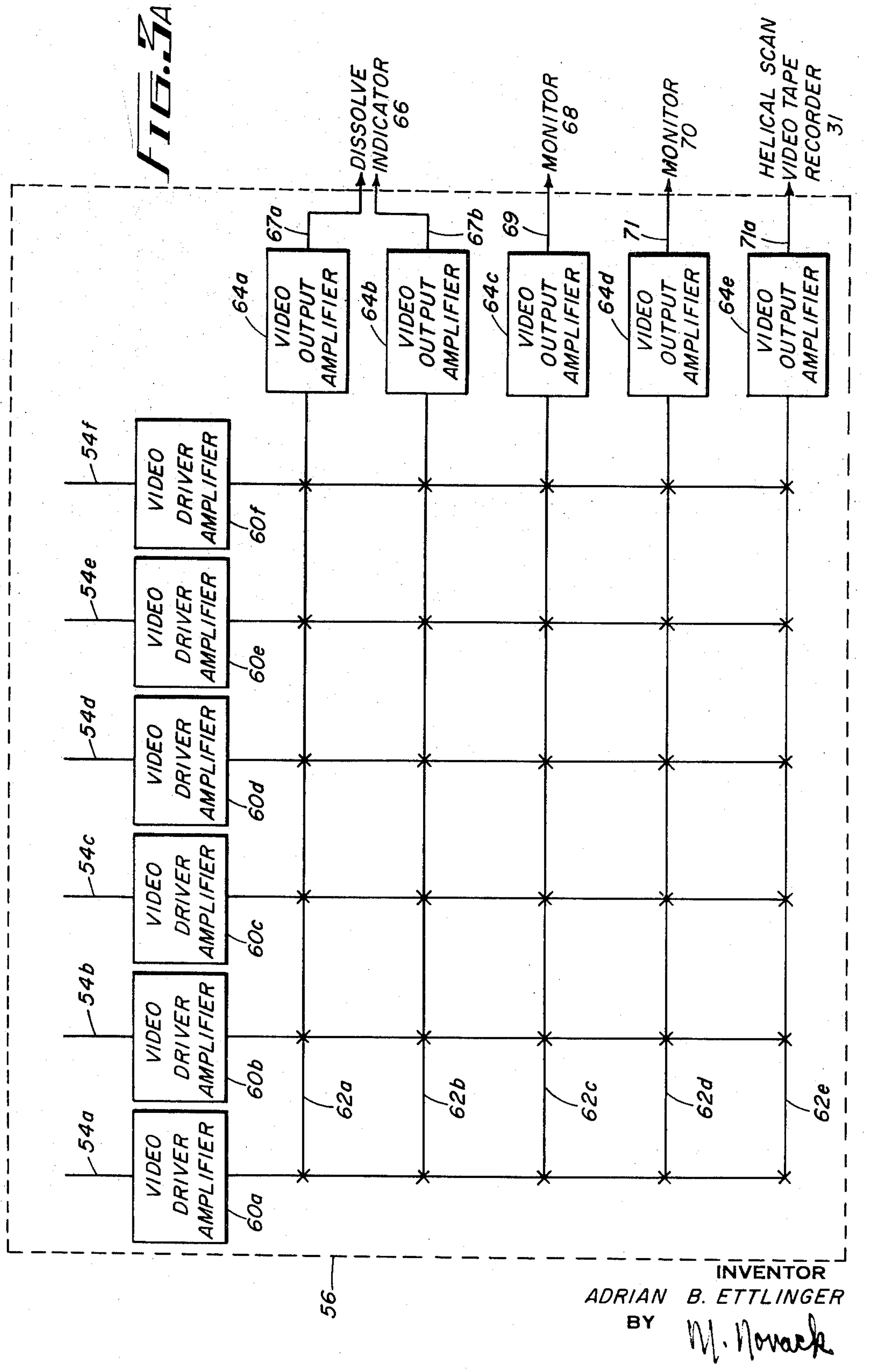
FIGS. 3A and 3B illustrate a represenative audio-video switching unit for use in the system shown in FIG. 1.

Referring now to FIG. 3A, wherein the video switching circuitry of the audio-video switching unit 56 is shown in detail, the cables **54*a*, 54*b*, 54*c*, 54*d*, 54*e* and 54*f* are coupled to the input terminals of a corresponding plurality of video driver amplifiers 60*a*–60*f*. The output terminals of the amplifiers 60*a*–60*f* are connected to five rows of conductors 62*a*, 62*b*, 62*c*, 62*d* and 62*e* which couple the video amplifier drivers to five output video amplifiers 64*a*–64*e*. The output terminals of the video output amplifiers 64α and 64*b* are connected via switching crosspoints to the input terminals of a dissolve indicator 66, to be described hereinafter, over cables 67*a* and 67*b* (FIG. 2A, 2B). As shown in FIGS. 2A and 2B, the dissolve indicator 66 is connected via a plurality of cables 68*a*–68*f* to the helical scan video tape recorders 22, 24, 26, 28, 30 and 31. Referring to FIGS. 3A, 2A and 2B, the output terminals of the amplifiers 64*c* and 64*d* are connected to a pair of monitors 68 and 70 over cables 69 and 71, respectively, and the output terminal of the amplifier 64*e* is connected to the recording logic of the overflow video tape recorder 31 via the cable 71*a*. One of the functions of the switching circuitry of the unit 56 is to allow video information recorded on the recorders 22, 24, 26, 28 and 30 to be transferred to the overflow recorder 31**.

As indicated by the X designations, the crosspoints between the output terminals of the video driver amplifiers **60*a*–60*f* and the rows 62*a*–62*e* are electrically interlocked such that any input signal may appear on any or all the output rows 62*a*–62*e* simultaneously. However, the amplifiers 62*a*–64*e* are responsive only to the video information signals supplied along the connector rows to which the amplifiers are operatively connected. Specifically, the amplifiers 64*a* will only respond to signals on the connector row 62*a*, the amplifier 64*b* will respond to signals only on the connector row 62*b*** and so forth.

In the dissolve mode of operation, the switcher shown in FIG. 3A enables a sequence of events in conjunction with the dissolve indicator 66 (FIG. 2A) as follows: (1) The video signal on the connector row **62*a* dissolves to the video signal on the connector row 62*b* in the indicator 66. The dissolve is controlled by the dissolve indicator 66 which supplies a signal to the video tape recorder coupled to the connector 62*a* and gradually disables the output from that video tape recorder. The duration of the dissolve is determined by the internal time constant of the dissolve indicator unit 66. (2) When the dissolve is completed, the indicator unit 66 generates a momentary interrupt signal which transfers the video tape recorder previously coupled to the connector 62*b* to the connector 62*a*. (3) With the video tape recorder to which the scene has dissolved on both connector rows 62*a* and 62*b*, the dissolve unit 66 disables the output of the video amplifier 64*b* with the result that the dissolve unit 66 responds only to the signals supplied by the amplifier 64*a***.

Figure 3B:
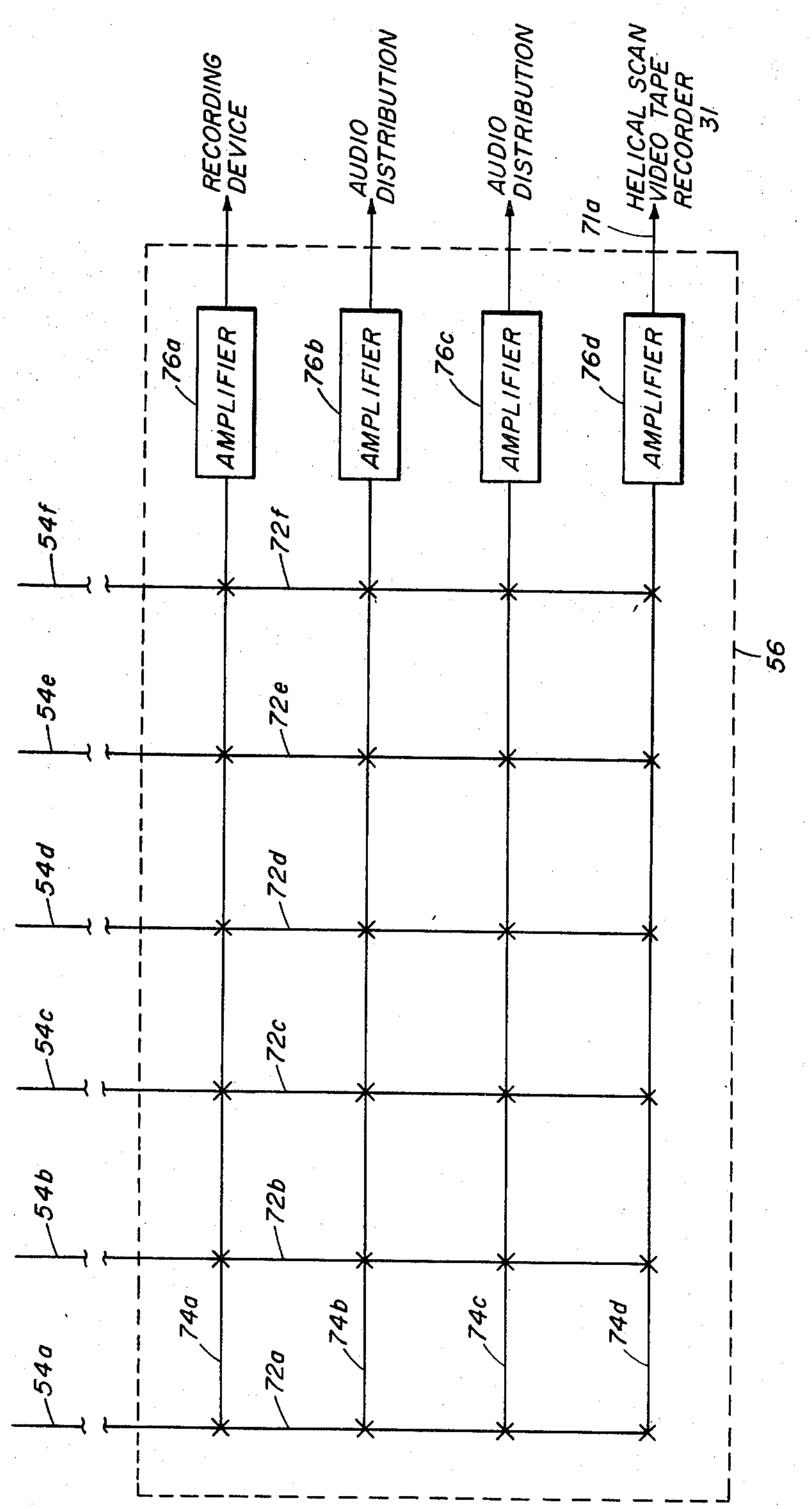

As shown in FIG. 3B, the audio switching circuitry of the audio-video switching unit 56 comprises a 6 x 4 matrix having six columns to which the audio output logic of the six helical scan video tape recorders 22, 24, 26, 28, 30 and 31 are coupled and to which a tone signal is coupled. Additional columns may be provided to accommodate additional tape recorders, as is understood in the art. The matrix comprises columns **72*a*–72*f* which are coupled to the cables 54*a*–54*f* and each of the column connectors is coupled via switching crosspoint to a plurality of connector rows 74*a*–74*d*. Again, as indicated by the designation X, the rows 74*a*–74*d*** are interlocked electrically.

The rows **74*a*–74*d* are, in turn, connected to the input terminals of four audio output amplifiers 76*a*, 76*b*, 76*c* and 76*d*, respectively. The output terminal of the amplifier 76*a*** is connected to a recording device (not shown)

which may record the audio information sequentially supplied to the connector row 74*a* by each of the helical scan tape recorders 22, 24, 26, 28, 30 and 31 as the recorders are activated. The audio amplifiers 76*b* and 76*c* are connected to audio distribution amplifiers (not shown) which may be coupled to reproduction devices for reproducing the sound associated with the video being reproduced on either the monitor 68 or the monitor 70. The audio recorded on the tape recorders 22, 24, 26, 28 and 30 may be transferred to the helical scan video tape recorder 31 by way of the amplifier 76*d* and the cable 71*a*.

Figure 3C:
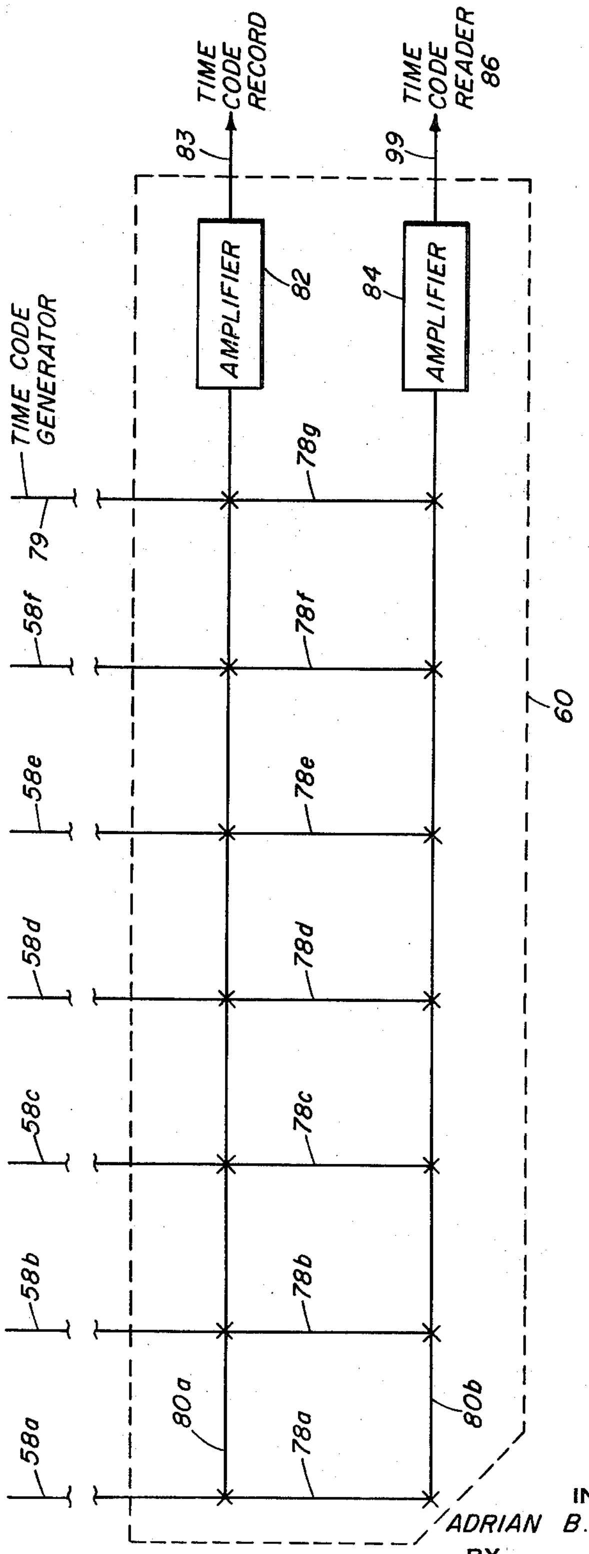
FIG. 3 C illustrates a representative time code switching unit for use in the FIG. 2 system.

As shown in FIG. 3C, the time code switching unit 60 comprises a plurality of input columns 78*a*–78*f* which are connected via the cables 58*a*–58*f* to the record/reproduce heads and associated logic of the second audio channels in the helical scan video tape recorders 22, 24, 26, 28, 30 and 31. Another input connector column 78*g* is connected to the time code generator 18 (FIGS. 2A, 2B) via a cable 79. The time code switching unit also includes two connector rows 80*a* and 80*b* which are coupled respectively to an amplifier 82 and an amplifier 84. As shown, the amplifier 82 is coupled via a cable 83 to the audio recording logic of the helical scan video tape recorder 31 and operates to record on the second audio channel thereof address signals generated by the generator 18. The address signals recorded on the audio channel of the recorder 31 may correspond to the addresses of the video information being transferred to the recorder from the recorders 22, 24, 26, 28 and 30 or may correspond to new addresses for such signals, at the option of the editor. The address signals reproduced from the audio channels in the recorders 22, 24, 26, 28 and 30 are received by the unit 60 and transmitted by way of the amplifier 84 and a conductor 99 to a time code reader 86. The reader encodes the coded address signals into parallel digital bits which can be accommodated by the computer 40.

The operation of the audio video switching unit 56 and the time code switching unit 60 is controlled by the digital computer 40 which is coupled to these devices via a conductor 89, a video and time code switch control unit 85 and a pair of cables 87 and 88. The computer control signals decoded by the control unit 85 and transmitted along the cables 87 and 88 take the form of enabling signals which selectively enable the crosspoints in the audio-video switching unit 56 in the time code switching unit 60 to make certain that the addressed video tape recorder is actually the one applying the video, audio and time code information, and no other.

The outputs of the control track channels of the helical scan video tape recorders 22, 24, 26, 28, 30 and 31 are coupled over a plurality of cables 94*a*–94*f* and through the time code reader 86 to the computer 40. As indicated above, time readers of the EECO type provide address time information within an accuracy of one second. Therefore, the computer includes a frame counter which responds to the synchronizing signals transmitted to it from the control channels of the video tape recorders to keep accurate track of the frame address of each frame of video information recorded on the tapes of the helical scan video tape recorders 22, 24, 26, 28, 30 and 31.

As above-mentioned, the first phase of the operation carried out by the system of FIG. 2 involves an examination of the contents of each of the helical scan video tape recorders 22, 24, 26, 28, 30 and 31. To accomplish this operation, the operator or editor, as the case may be, by properly positioning the light pen on the face of the cathode ray tube of the CRT terminal 46, generates an alphanumeric code signal which is decoded by the digital computer 40 as requiring all the helical scan video tape recorders 22, 24, 26, 28, 30 and 31 to rewind to their starting positions. The computer issues this rewind instruction via the transport control unit 50 and the tapes on the video tape recorders are rewound to their starting points. Thereafter, the operator positions the light pen on the face of the cathode ray tube of the CRT terminal to cause an alphanumeric signal to be generated. This predetermined character signal is decoded by the digital computer 40 and an operational sequence is initiated whereby a play instruction is transmitted via the transport control unit 50 to the first of the helical scan video tape recorders, 22.

In response to the signal, the helical scan video tape recorder 22 will begin to play in the forward direction and the video information recorded thereon will be reproduced. This video information is supplied by way of the cable 54*a* to the audio video switching unit 56 which couples the signals to either the monitor 68 or the monitor 70 for reproduction, and couples the audio track thereon to a sound reproduction unit (not shown). Thus, the operator will view the information recorded on the helical scan video tape recorder 22 on either the monitor 68 or the monitor 70 and listen to the associated audio. (As shown in FIG. 2, the monitors 68 and 70 can be advantageously mounted on a common control console along with the CRT display 46*b*.)

At the same time the video information is reproduced, the address signals supplied to the time code switching unit 60 by the cable 58*a* are transferred to and encoded into digital data bits by the time code reader 86. Also, the cable 94*a* couples the synchronizing signals from the control track of tape recorder 22 to computer 40 via the time code reader 86. Thus, as information is being reproduced from the tape of the helical scan video tape recorder 22, the frame addresses corresponding to precise physical locations on the video tape are supplied to the digital computer 40. The computer 40 stores the precise information addresses in minutes, seconds and frames in predetermined memory locations. As abovementioned, the frame signals are generated within the computer 40 in response to the synchronizing signals. The foregoing tape transfer control operation is then implemented with respect to the helical scan video tape recorders 24, 26, 28, and 30 such that the operator will have knowledge of the information recorded in each of the recorders and the addresses of the information will have been stored in the memory of the digital computer 40.

The second phase of the operation carried out by the automatic editing and assembly system of FIG. 2 is a so-called editing operation which is essentially the process of expressing the editor's ideas in a flow of pictures arranged in a time sequence by joining together the video information recorded on the tapes of the helical scan video tape recorders 22, 24, 26, 28 and 30. By use of the light pen of the terminal 46, the editor initially issues a rewind command to all six of the helicial scan video tape recorders 22, 24, 26, 28, 30 and 31 so as to cue the tapes thereof to a starting position. The very first element the editor wishes to edit is selected and supplied to the monitor 70. This video is then transferred over to the monitor 68 through the issuance of a "cut" command, as will be apparent hereinafter. Mindful then of the video information on each of the helical scan video tape recorders, and using a marked script for example, the editor selects the second of the two elements he wishes to edit and displays this signal on the monitor 70.

The actual editing is accomplished, for example, by issuing a play command through the CRT terminal 46 and sequentially to the two helical scan video tape recorders requiring editing, for example, helical scan video tape recorders 22 and 24. The video information recorded on the tapes of these two recorders is supplied to the audio video switching unit 56 via cables 54*a* and 54*b*. From the unit 56, the video signals supplied by the helical scan video tape recorder 22 are transmitted by way of the video output amplifier 64*c* (FIG. 3A) to the monitor 68 and the video information signals from the helical scan video tape recorder 24 are transmitted to the monitor 70 by way of the amplifier 64*d* (FIG. 3A).

The locations of the tapes in the helical scan video tape recorders 22 and 24 are monitored in sequence by the time code reader 86 and the computer 40. Such monitoring is enabled by selectively enabling the column connectors 78*a* and 78*b* in the time code switching unit 60 (FIG. 3C) and supplying the time code signals to the computer 40. With respect to the audio information, the audio signals contained on the tapes of the helical scan video tape recorders 22 and 24 are transmitted by the audio video switching unit 56 (FIG. 3B) to a loud-speaker through an audio distribution panel (not shown), and reproduced.

The editor then stops the playing of each recorder at a proposed edit point. At this time, the video information contained on the tap of the video tape recorder 22 will be displayed as a still-frame by the monitor 68 and the video information contained on the tape of the recorder 24 will be displayed as a still-frame by the monitor 70. If the editor is satisfied he then issues a "cut" instruction which effectively transfers the helical scan video tape recorder 24 to the monitor 68 and the addresses of the tapes in the recorders are stored in the computer's memory together with the cut instruction. As used herein, the monitor 68 displays the end of an already selected "program" and the monitor 70 represents the new video information until the transfer is effected.

The editor then issues a play command to the recorder 24 which plays until stopped by the editor at another editing point. Another recorder, e.g., recorder 28 is then operated until the information recorded thereon which is to be utilized is reproduced on the monitor 70. At this time the recorder can be stopped and another "cut" made.

The computer 40 maintains track of the address of the last frame of the video information stored on a particular helical scan video tape recorder, e.g., recorder 22 which was displayed on the monitor 68 and the address of the frame or frames of the video information recorded on the helical scan video tape recorder, e.g., 24 which is transferred to the monitor 68 from the monitor 70. There is an apparent constraint, however, on the sequence of operations carried out by the system of FIG. 2. The problem occurs when the editor wishes to view a transition as between two segments of picture information which are recorded on the same helical scan video tape recorder. For example, if the address of the tape on the helical scan video recorder 24 which was transferred to monitor 68 was six minutes, fifteen seconds, and four frames (06:15:04), the editor could not simultaneously view on the monitor 70 another portion of the take on the video recorder 24 having an address of four minutes, ten seconds, one frame (04:10:01).

However, to accommodate just such a situation, the overflow helical scan video tape recorder 31 is provided. While the helical scan viedo tape recorder 24 is playing, but has not yet reached the point where the first cut is to be made, the helical scan video tape recorder 24 is stopped at the address of 04:10:01. Under computer control, the video recorded at this address is then transferred to the helical scan video tape recorder 31. The address, i.e., 04:10:01 may be retained when the transfer to the recorder 31 is made or, in the alternative, a new address such as 00:00:00 may be recorded on the tape of the recorder 31 by the time code generator 18 through the time code switching unit 60. The transfer of video information between recorders is accomplished by activating the row connector 62*e* such that the video information recorded on the helical scan video tape recorder 24 is transferred by way of the amplifier 64*e* to the helical scan video tape recorder 31. Accordingly, when it is desired to transfer this information to the monitor 68, the information having been transferred from the recorder 24 to the recorder 31, the helical scan video tape recorder 31 is addressed and the information contained on the tape thereof can be transferred to the monitor 68.

The foregoing editing procedure continues until the editor decides that he wishes to review or rehearse the excerpts which he has chosen. He may wish, for example, to merely see a real time replay of the last two cuts he has made. Or, he may wish to review the program consisting of, say, his last ten cuts or decisions. The editor indicates to the computer, using the light pen, that he wishes to see a real time replay beginning at a specified cut. The computer has stored therein a complete list of all of the editing decisions which have been made by the editor during a particular editing session. This list may be conveniently referred to as the "master list." When the editor indicates that he desires a rehearse, the computer effectively forms a "rehearse list" consisting of those members of the master list which constitute the excerpts that the editor wishes to review.

Figure 6A:
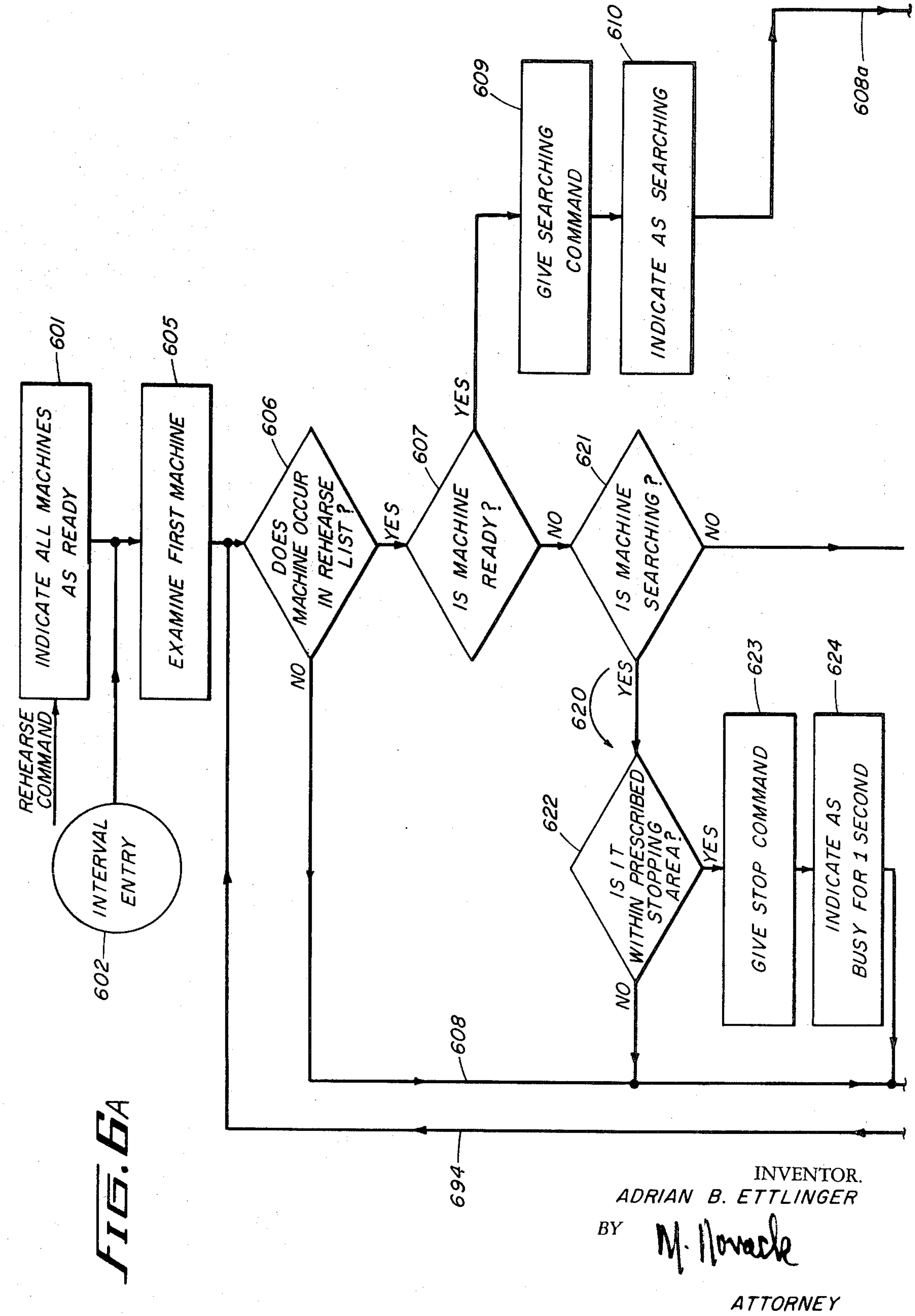
FIGS. 6A, 6B, and 6C, when positioned horizontally one below another, form a simplified flow chart diagram of a computer program used to implement a "rehearse" of editor-selected excepts in the embodiment of FIGS. 2A–2B.
Figure 6B:
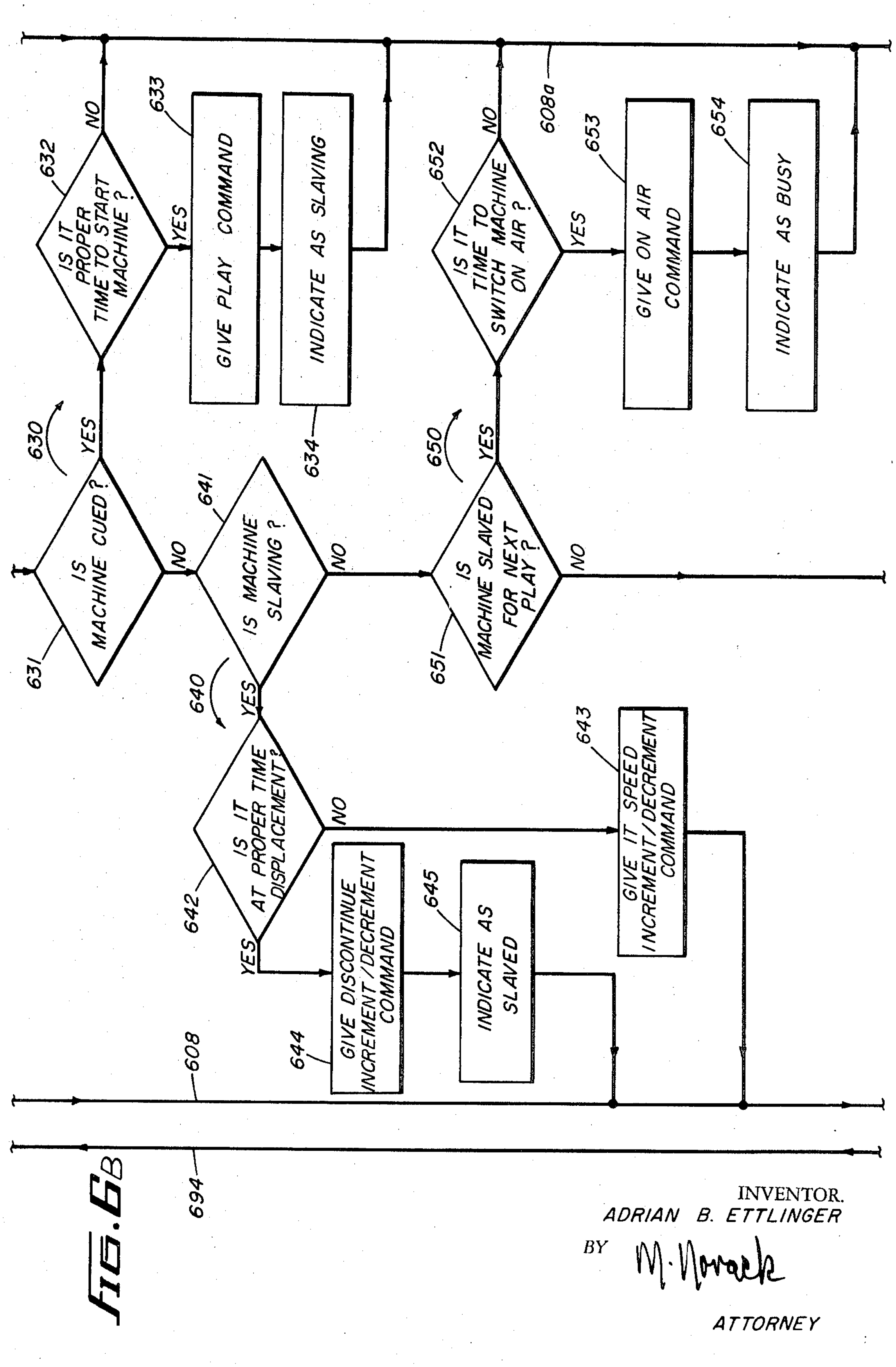
Figure 6C:
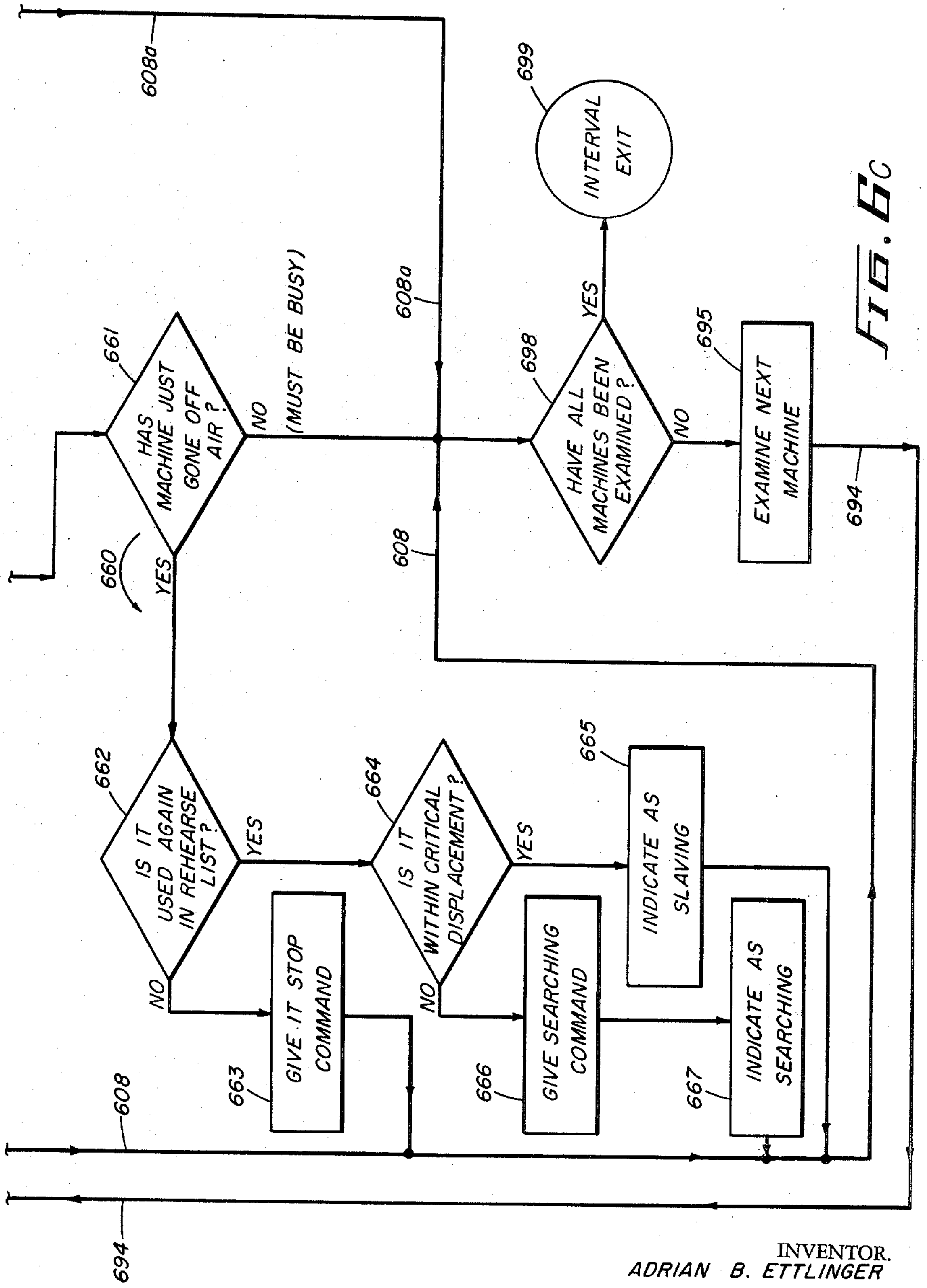

FIGS. 6A, 6B and 6C illustrate a simplified flow chart of the computer subroutine utilized to implement the automatic real-time rehearse feature of the invention. The subroutine is initiated by a command from the editor who, using the light pen, indicates that he desires to see a continuous rendition of the excerpts defined by a certain number of his previously selected editing decisions.

Each decision stored in the computer includes the entrance time code of its associated excerpt and the duration of the excerpt. The entrance time and duration of each decision are expressed in hours, minutes, seconds, and frames. Additional information, such as the duration of the transition between excerpts (for example, the duration of a dissolve) may typically be included in each stored decision.

The computer 40 knows the machine designation and physical location of every time code address on the six helical scan VTR's, as this information was stored in the computer during the abovedescribed initial play of the helical scan VTR's. For convenience in describing the program, the six VTR's 22, 24, 28, 30 and 31 will be referred to as the "first machine" through the "sixth machine." The computer 40 performs logical computations and controls the rehearsals by issuing appropriate instructions to the transport control unit 50 and the switch control unit 85 while constantly receiving address information through the time code reader 86. For example, if the tape of a particular machine is to be moved to a specified address, the computer would issue the appropriate instructions to the transport control unit 50 which would achieve the desired movement. Or, if it becomes time for a particular machine to be switched "on the air" (i.e., viewed and/or heard by the editor), the computer 40 would issue an appropriate instruction to the switch control unit 85. The switch control unit would, in turn, control the audio-video switching unit 56 to couple the particular machine output of the monitor 68 and/or switch the audio from the particular machine to an output speaker. (It is arbitrarily assumed that the entire rehearse is to be shown on the monitor 68, but this is, of course, a matter of choice.)

Referring specifically to FIG. 6, the rehearse subroutine is initiated by a rehearse command from the editor which, as is seen from the function box 601, indicates all machines as being "ready." In the operation of the computer 40 (FIG. 2), certain subroutines, such as that of FIG. 6, when active, are implemented and up-dated every sixtieth of a second. This means that during a particular sixtieth of a second interval certain instructions are issued by the computer to the editing system. During the next sixtieth of a second interval, the computer takes a "fresh look" at the status of the editing system and issues another set of instructions in accordance with the up-dated status. This process continues for as long as the particular subroutine is active. In FIG. 6, the rehearse command renders the subroutine active and it remains active until the rehearse is completed, or, another command from the editor terminates or interrupts the rehearse. During each sixtieth of a second, the subroutine begins at the "interval entry" circle 602 at the top of the figure and ends at the interval exit circle 699 at the bottom of the figure. During every interval, each of the machines is examined and, if required, given an up-dated command depending on its status. When all machines have been examined, the "comparison" or "decision" diamond 698 allows from the interval.

As indicated above, the rehearse command indicates all machines as being "ready." At the first interval, the subroutine begins by examining the first machine, as is mandated by the function box 605. The box 605 is linked to the decision diamond 606 which activates the determination of the question "does the machine occur in the rehearse list?" In other words, the determination is made as to whether or not the machine being examined contains an excerpt which is part of the rehearse. The answer to this question will be "no" if either the machine is not used at all during the rehearse, or, if the machine has already been used during the rehearse, has completed its function, and does not occur again in the list of decisions to be rehearsed. The answer to the question will be "yes" if the machine is currently active in the rehearse or is to be used again during a later portion of the rehearse.

Assume, for example, that the first machine does not occur in the list. The "no" branch from the diamond 606 would then be linked along branch 608 (which extends along the left side of the flow chart from top to bottom) to the diamond 698. Since only the first machine has been examined during this interval, the answer to diamond 698 is "no" which directs the subroutine to the function box 695 and examination of the next machine; viz, the second machine. The branch 694 (which runs from bottom to top along the left hand side of the figure) brings the subroutine again to the diamond 606 for determination of whether the second machine occurs in the list. Assuming, for example, that it does occur in the list, the subroutine next determines, in accordance with diamond 607, whether the machine is "ready." It will be appreciated that during the first interval the answer to this question for all machines is "yes" since the rehearse command had set all machines to an indication of "ready" (function box 601). During subsequent intervals, the answer to this question will always be "no" since box 601 will not again be activated. For this first interval, the answer "yes" to diamond 607 leads to the function box 609 which initiates a "searching" command for the second machine.

It is useful at this point to define certain terms which pertain to the status of the machines used during the rehearse. It is assumed that at the initiation of the rehearse command all machines had been given "stop" commands and had come to rest at a particular address position unrelated to the rehearse. Each machine to be used in the rehearse generally goes through the basic sequence of "searching," "stopping from search," being "cued," "slaving," being "slaved," going "on the air," going "off the air," and "stopping." (Some of these conditions are a function of the particular storage media used in the instant embodiment of the editing system; namely, magnetic video tape.) If a machine was previously stopped at some random address, the tape on the machine must be moved to an address that is near a selected address at which the machine is to begin "on the air" play, so that the machine will be physically prepared for play when the appropriate time comes. This new rest position is known as the "cue point," and does not, of course, correspond to the address at which the machine actually goes on the air, but will be some address a predetermined distance on the tape before the actual first frame to appear on the monitor (or first sound to occur on the speaker output). The predetermined distance is needed to get the particular machine started and to have the tape of the machine moving at proper play speed. Also, it is necessary to have the frame or sound output of the machine synchronized with another machine which is presently on the air and is to next go off the air. The synchronization is required so that the transition will appear smooth during the rehearse.

To get the machine in question to the cue point for its next play, the computer will issue a "search" command which results in the machine moving toward the cue point. Depending on the machine's present tape distance from its next cue point (as calculated by the computer) the searching will generally consist of a fast forward or fast rewind of the machine in question. When the machine in question nears the calculated cue point, the computer will issue a stop command and it will take a certain finite time and tape movement before the tape actually stops at the cue point. During this stopping time the machine is defined as being "busy."

When the machine is cued for its next play, there are certain determinations which the computer must make concerning the machine. The computer must determine the appropriate time to get the machine started from its cut point; it must direct the machine such that its tape is moving in proper synchronization to be switched on the air; and, it must actually switch the machine on the air when the appropriate time arrives. These calculations are, of course, a function of the rehearse list of editing decisions. The computer effectively sorts the rehearse list and calculates the command points for the indicated determinations.

When a machine that has been previously cued is almost ready to be switched on the air, the computer will begin the machine "slaving." The slaving condition means that the computer will issue appropriate transport control to the machine to get the machine tape moving such that it is in proper "time displacement" or synchronization with the tape on the machine that is presently playing on the air. The computer does this by issuing increments or decrements of speed to the machine tape in accordance with its present condition, which the computer constantly monitors. When the machine is in the desired synchronized relationship it is said to be "slaved."

Continuing with the definitions, after a machine has been switched on the air, it is defined as "busy" for as long as it remains on the air. A machine which has just been switched off the air is appropriately defined as "just gone off air," meaning that the output of the machine is no longer being displayed on the monitor 68, but that the machine is still running; that is, the tape of the machine is still moving.

Returning to the description of the FIG. 6 flow chart and the examination of the second machine during the first interval, the function box 609 has been described as having initiated searching by the second machine and its associated function box 610 indicates the status of the machine as "searching." The examination of the second machine during this interval is now concluded, as is indicated by the output of box 610 having a link to the branch 608A (which runs from top to bottom along the right side of the figure). The branch **608*a* leads again successively to the boxes 698 and 695 which results in examination of the next machine; viz, the third machine. In similar manner to the second machine, the third, fourth, and fifth machines (assuming they are all used in the rehearse) are each started searching toward their first cue point. After the searching command has been given to the fifth machine, the answer to the decision diamond 698 will be "yes," all machines have been examined. This "yes" indication will signify an interval exit (circle 699**).

During the next sixtieth of a second the flow chart is again entered starting with the interval entry circle 602 and each machine is again examined during this second interval. During the second and subsequent intervals each machine involved in the rehearse will generally be acted upon by passage of the subroutine through one of the loops, indicated in the figure by the "loop arrows" 620, 630, 640, 650, or 660. The only condition under which a machine that occurs in the rehearse list will not be controlled by one of the indicated program loops is when the machine is "busy"; where "busy" has been defined as "stopping from a search" or playing "on the air." When a machine is "busy," the answer to each of the successive decision diamonds 621, 631, 641, 651 and 661 (down the center of the figure) is "no," and none of the lops 620–660 is entered. In this case the subroutine passes inactively to diamond 698 and then either to the next machine (695) or to an interval exit (699). When a machine is not "busy," the subroutine enters one of the loops 620–660, updates commands and indications to the machine, and then passes to one of the branches 608 or 608*a*. As was indicated, each of these branches leads to the diamond 698 which causes either examination of the next machine or interval exit.

The various loops of the subroutine, 620–660 can be individually described as follows:

Loop 620: While a machine is searching, the computer is constantly monitoring whether it has arrived at its prescribed stopping area. This decision is indicated by the comparison diamond 622. When the machne is within the prescribed stopping area, the function boxes 623 and 624 show that the machine is stopped and indicated as "busy" for one second. During this one second, the tape is given a chance to stop and come to rest.

Loop 630: When the machine has been cued for its next play, the computer, having previously calculated the proper time for the machine to begin its tape motion, determines whether the proper time to start the machine has arrived. This criteria is indicated by the decision diamond 632. When the proper time arrives, the function boxes 633 and 634 show that the machine is given a "play" command and is indicated as "slaving."

Loop 640: When the machine is slaving, the computer continuously monitors its tape position to determine if it is in proper synchronization with the tape on the machine that is presently playing on the air. This determination is indicated by the decision diamond 642. If the machine is not in proper synchronization, (i.e., "time displacement") the machine is given a speed increment or speed decrement command in accordance with its actual displacement as calculated by the computer. This is indicated by the function box 643. When, however, the machine is determined as being at a proper time displacement, the computer discontinues issuance of increment/decrement commands and indicates the machine as "slaved." These functions are shown by the blocks 644 and 645.

Loop 650: When the machine is slaved for its next play, the computer determines whether it is time to switch the machine "on the air," as is shown by the diamond 652. This calculated time will substantialy correspond to the time at which the machine that is presently on the air is to be switched off the air. When the appropriate time arrives, the computer issues "on the air" instructions and indicates the machine, which has just gone on the air, as "busy." These functions are shown by the boxes 653 and 654.

Loop 660: When a machine finishes its "on the air" play of a prescribed excerpt in the rehearse list it is automatically switched off the air by virtue of next machine being switched on the air (diamond 652), or, by a completion of the rehearse. When the rehearse is completed, the computer issues a stop to all machines (not shown in flow chart). In all other cases, when a machine has just been switched off the loop 660 is activated and the computer determines whether the machine is to be used again in the rehearse list, as is indicated by the diamond 662. In other words, the computer determines whether a future excerpt of the rehearse is contained on the tape of the machine which has just been switched off the air. It should be noted that this determination (diamond 662) is somewhat different than that of the diamond 606 which has the additional purpose of, during each interval, determining whether a machine presently occurs in the rehearse list. For example, if a machine is presently engaged in the play of its last excerpt contribution to the list, the answer to the diamond 606 will be "yes" during the machine's entire activity until it is switched off the air. When a machine has been switched off the air, the excerpt which it has just played is effectively removed from the rehearse list by the computer and the answer to the diamond 662 will depend upon whether or not the machine is to play another excerpt during the rehearse. If the answer to this question is "no," the machine is given a "stop" command, as is indicated by the function box 663. In this case, during subsequent intervals the answer to the diamond 606 will be "no" since the machine no longer effectively occurs in the rehearse list. The reult is that the machine will be by-passed by the subroutine in subsequent intervals by direct passage through the diamond 698 via the branch 608. Returning to the diamond 662, if the machine does contain another excerpt to be played during the rehearse, the computer calculates whether the machine is to be used again almost immediately. In a practical situation, this would typically occur in a situation where, for example, the display was to (a) show a first person speaking; (b) flash over for a reaction shot of a second person listener for a second or two; and (c) return for viewing of the first person speaker. In such a case, the two separated excerpts of the first person speaking, will often be on the same helical scan video tape recorder, and this machine, once switched off the air for the first time, should continue at normal play speed in readiness to be almost immediately switched on the air again. When the computer calculates that such a situation is present, the function box 665 accomplishes this objcetive by indicating the machine as slaving, so that it will be kept in synchronization beginning with passage through the loop 640 during the next interval. If, however, the machine's next usage in the rehearsal is not at a so-called "critical displacement," the machine is given a searching command and indicated as searching, as is shown by the function boxes 666 and 667. This will start the machine searching toward the cue point for play of its next excerpt.

The described rehearsal operation may be interrupted by the editor while in progress, as will typically be the case when the editor finds that he is dissatisfied with a part of his previous work. The editor may, for example, still-frame a scene during the rehearse and then, using the light pen, display on the monitor 70 a new region of video information that he wishes to add to his previously formed program. When he finds a suitable transition point he may execute a new "cut" in the described manner. The new editing decision is then added by the computer to the master list. The fact that the editor-selected program takes the form of a list stored in the computer allows the editor complete flexibility in reviewing and amending the program without the need for rerecording or splicing. The editor may preserve any compilation of stored addresses (in case he decides he likes what he had had better than his revision) by directing the computer to punch out the master list on paper tape. This may typically be done many times during an editing session and, for example, before a rehearse during which the editor plans to experiment with a change. Any of the punched out lists may later be used as a starting point for further editing or for assembly of a master tape.

Figure 4:
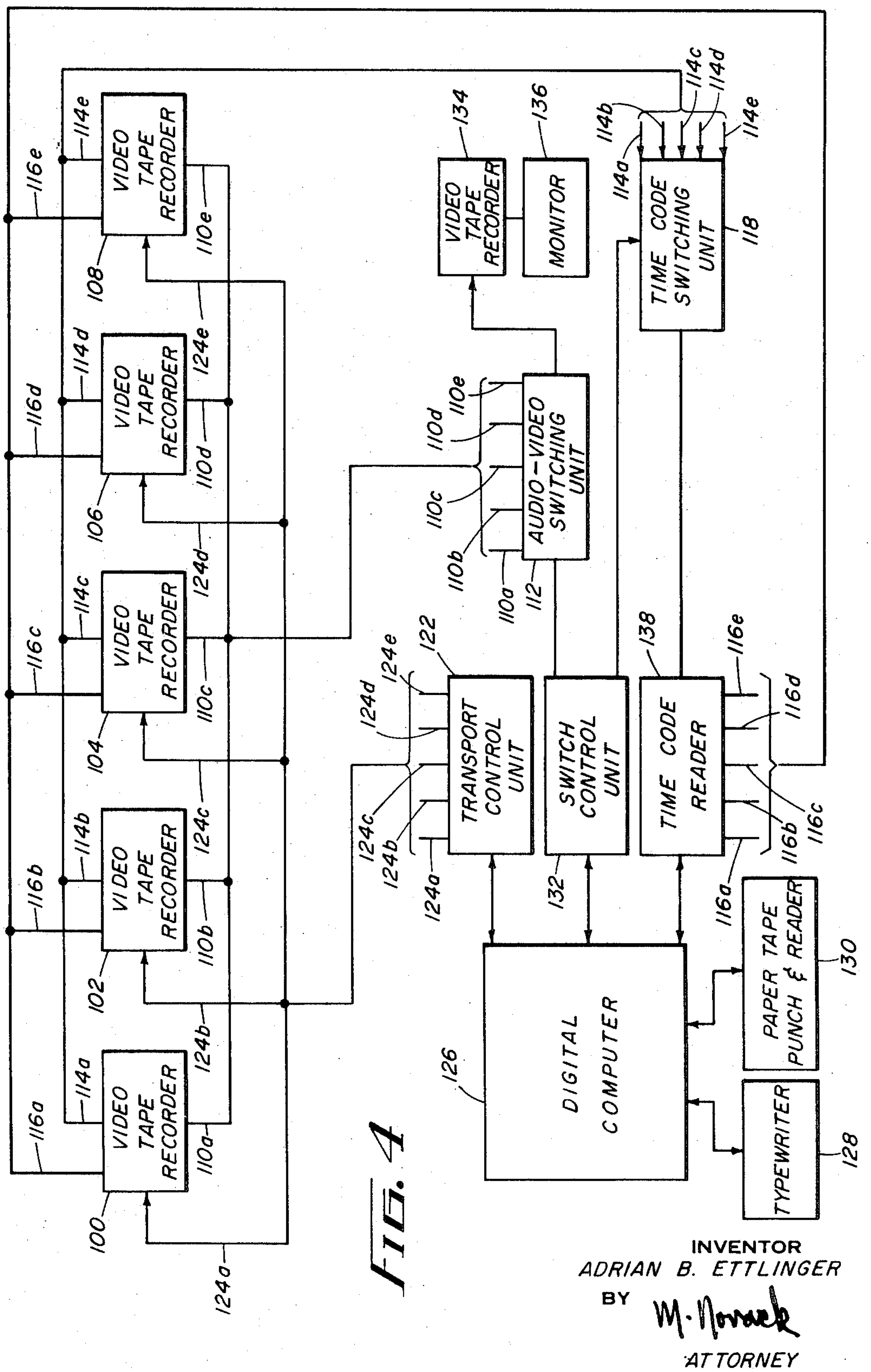
FIG. 4 is a schematic block diagram of a typical automatic assembly system arranged according to the present invention.

Referring now to FIG. 4, there is shown apparatus for carrying out the so-called assembly operation of the present invention. There are provided at least five video tape recorders 100, 102, 104, 106 and 108 on which are recorded a corresponding number of "takes" of video information segments relating to an object field or scene. Preferably, the video tape recorders, 100, 102, 104, 106 and 108 are highband color video tape recorders and, to this end, may be of the type known as the Ampex quadraplex VR–2000 type. The video information recorded on these recorders is received from the video tape recorder 14, for example, (FIGS. 2A, 2B) and corresponds to the video information recorded on the helical scan video recorders 22, 24, 26, 28 and 30. As above described, also recorded on the tapes of these recorders are coded time signals representative of the addresses in minutes, seconds and frames of the recorded video information. The coded time signals are recorded on the cue tracks of the tapes over their entire lengths in synchronism with the control track signals.

The amplifying circuitry associated with the record/reproduce heads of the video tape recorders 100, 102, 104, 106 and 108 are coupled over corresponding cables 110*a*, 110*b*, 110*c*, 110*d* and 110*e* to the input terminals of an audio-video switching unit 112 which may be of the type illustrated in FIGS. 3A and 3B. The circuitry associated with the cue tracks and control tracks of the video tape recorders 100, 102, 104, 106 and 108 are connected by way of separate cables 114*a*–114*e* and 116*a*–116*e* to a time code switching unit 118, which may be of the type illustrated in FIG. 3C, and to a time code reader 138, respectively. The address signals in minutes and seconds are carried over the cables 114*a*–114*e*, while the synchronization signals to enable frame counting are carried by the cables 116*a*–116*e*.

As with the helical scan video tape recorders disclosed in FIG. 2, the functions of the video tape recorders 100, 102, 104, 106 and 108 are controlled by a transport control unit 122 which is coupled to the video tape recorders by way of cables 124*a*–124*e*. In turn, the transport control unit 122 is controlled by a general purpose digital computer 126, which again may be of the PDP 8 type manufactured by the Digital Equipment Corporation.

The computer 126 includes as standard equipment a teletypewriter 218 having a keyboard for transferring instructions to the computer 126, a printer for producing a hard copy of the information stored in the computer, and a paper tape punch and reader for punching out a stored program on paper tape and for responding to such punched program to control the operation of the computer 126. The teletypewriter 128 is of conventional construction and supplied as standard equipment with digital computers of the DEC PDP 8 type.

Also included is a switch control unit 132 which controls the switching of the audio and video information supplied to the switching unit 112 from the video tape recorders 100, 102, 104, 106 and 108 under computer control. The computer also controls the switching by the time code switching unit 118 as between the coded address signals supplied from the cue tracks of the video tape recorders 100, 102, 104, 106 and 108.

The output of the audio-video switching unit 112 is connected to a video tape recorder 134, again of a high-band color type, whereon a finally assembled video tape is recorded. To reproduce the video information recorded on the recorder 134, a monitor 136 is provided. As with the system illustrated in FIGS. 2A and 2B, the time code switching unit 118 is coupled to a time code reader 138 which encodes the time code address signals supplied thereto by the unit 118 into parallel digital data bits which are suitable for transmission to the digital computer 126.

The assembly operation carried out by the system of FIG. 4 is similar to the real time replay operation carried out by the system of FIGS. 2A and 2B but, here, there is no requirement to operate in real time. In particular, an assembly program is loaded into the computer 126 by means of the paper tape reader 130. The first series of instructions in the program carries out the rewinding of the recorders 100, 102, 104, 106 and 108 to positions where the recorders are first used. Thereafter, under program control, the computer operates the recorders in a sequence corresponding to the editing sequence originally arrived at manually by the editor. As predetermined locations on the tapes of the recorders 100, 102, 104, 106 and 108 are addressed, the video information recorded at these locations is supplied by way of the audio-video switching unit 112 to the video tape recorder 134. A finally edited television program is assembled on the tape of the recorder 134.

As with the video information recorded on the video tape recorders 100, 102, 104, 106 and 108, the audio information recorded thereon is switched in a predetermined item sequence in synchronism with the video switching such that the video tape recorder 134 will record on the audio track of its tape audio information synchronized with the video.

The apparatus of FIG. 4, which utilizes multiple video tape recorders in the assembly operation, can perform the assembly relatively quickly. It will be appreciated, however, that the assembly operation may be performed by dubbing directly from the video tape recorder 14 under computer control. This operation will necessarily take longer since the selected excerpts may be distantly disposed on the tape 14. It should also be noted that additional recorders may be necessary to achieve the assembly of special effects.

Figure 5A:
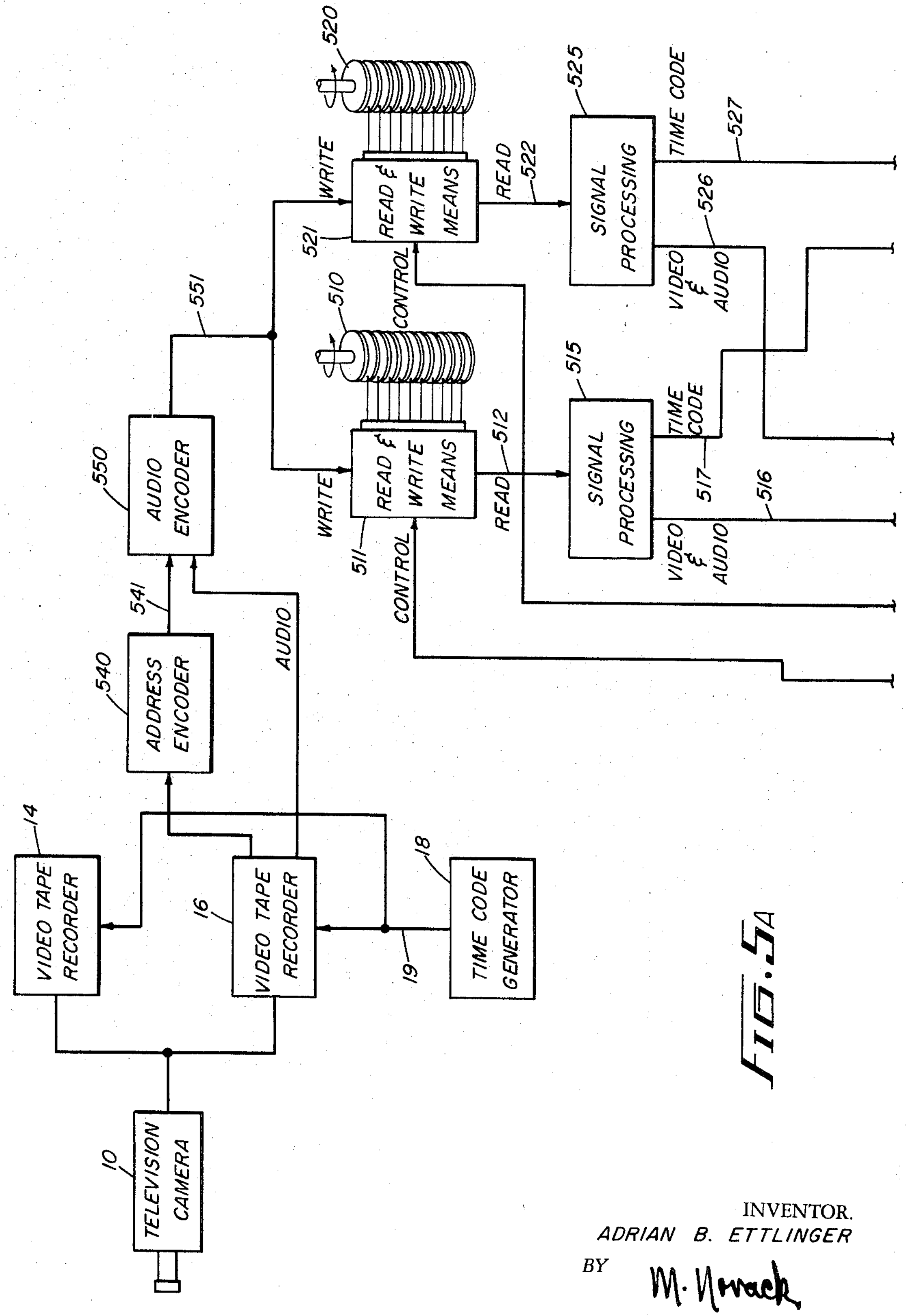
FIGS. 5A and 5B show, in schematic form, another embodiment of an automatic editing system arranged according to the present invention.
Figure 5B:
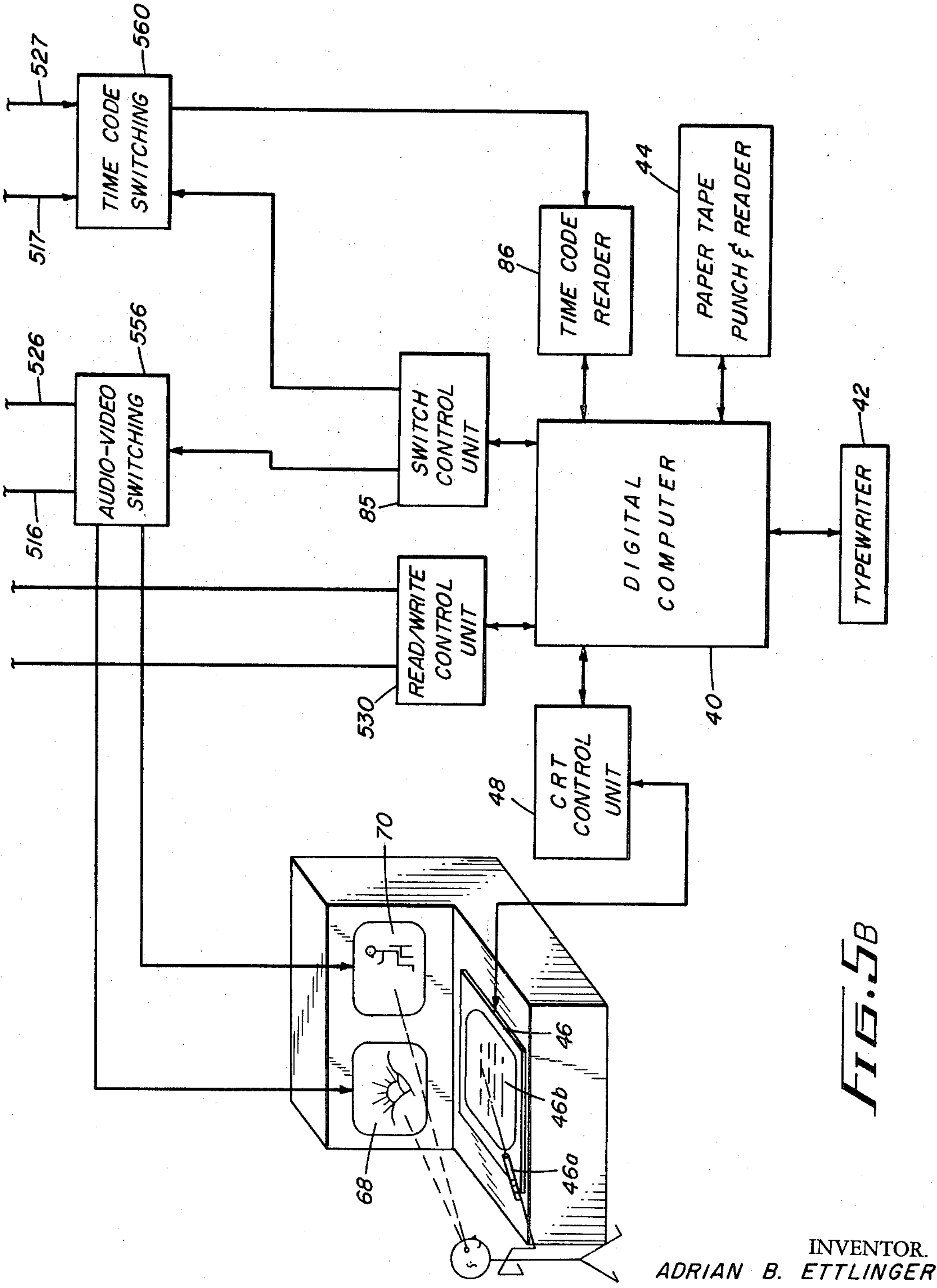

Referring now to FIGS. 5A and 5B there is illustrated an embodiment of the present invention which utilizes a rapid-access storage medium. As represented in the figure, a pair of disc-pack type storage devices 510 and 520 have sets of read/write means 511 and 521 associated respectively therewith. The storage devices may be of the type manufactured by Memorex Corporation and designated as the "Mark VI" disc pack. Each disc pack consists of eleven aluminum discs coated with a magnetic oxide and mounted about a half-inch apart on a common hub. Information is recorded on the twenty inner disc surfaces by polarizing the magnetic oxide particles. The particles are disposed on two hundred concentric circles or "tracks" on each disc surface. Since corresponding tracks on all twenty surfaces are vertically aligned, they are considered "information cylinders"; there being two hundred such cylinders per disc pack.

The disc packs 510 and 520 are adapted for installation on the spindle of a disc driver (not shown) which rotates them at a speed of 1800 r.p.m. A suitable driver is Memorex Corporation's Model 660–1 Series Disc Drive. The Model 660–1 also includes reading and writing means, the equivalent of which are designated in FIG. 5 as the units 511 and 521. There are twenty movable read/write heads in each unit (one for each disc surface). The heads move on a single carriage so that all twenty heads are positioned to the same cylinder simultaneously. However, only one head is selected to read or write at a time. The heads can move relatively quickly between remote cylinders, having an average access time of fifty milliseconds. The maximum possible access time as between cylinders is eighty milliseconds.

The control of the carriage position and the selection of the head which is to read or write is accomplished by the disc pack read/write control unit 530. (The unit 530, which includes extensive switching and logic circuitry as well as precision driver controls, is included as a part of Model 660–1.) The control unit 530 is responsive to computer control signals from a digital computer 40, which may be of type described with reference to the previous embodiment of FIG. 2. As before, the computer has associated therewith a CRT terminal 46 and a control unit 48 which are controllable with a light pen 46*a*.

In the manner of the previous embodiment, signals developed by a color television camera 10 are supplied to highband video tape recorders 14 and 16. For purposes of illustrating the present embodiment it will be assumed that two "takes" of the same scene are to be edited, but it will become apparent that any number of takes can be edited using the disclosed system or logical extensions thereof. Time code generator 18 supplies address signals consisting of coded time signal for hours, minutes, seconds and frames of the television signals over the cable 19 to the recorders 14 and 16. As above-described, the coded address signals are recorded over their entire length in synchronism with the control track signals on the tape.

The video tape recorder 16 is coupled through the encoders 540 and 550 to the read/write means 511 and 521 of the two disc storage devices. The encoder 540 takes the time coded address information associated with each frame and combines it with the video signal by inserting the address in the vertical blanking interval of the video signal. Various techniques for inserting auxiliary information in the vertical blanking interval of a television signal are known in the art, an example being the technique disclosed in the U.S. Pat. No. 3,493,674 of Houghton. The encoder 550 receives the address-encoded video signal 541 and combines it with its corresponding audio information from the video tape recorder 16. This can be accomplished in known manner by inserting a coded version of the audio in the horizontal blanking intervals of the video signal. A technique for the insertion of audio signals in the horizontal blanking intervals of television video signals is disclosed, for example, in U.S. Pat. No. 3,423,520 of H. P. Kelly. The encoders 540 and 550 necessarily receive the vertical and horizontal synchronizing signals associated with the information on the tape recorder 16. This may be accomplished, for example, by utilizing a conventional sync signal generator (not shown) which supplies common vertical and horizontal sync signals to each cooperating member.

The composite signal 551 is applied to the storage devices 510 and 520 under control of the read/write control unit 530 which activates the appropriate "write" heads of one of the read/write means 611 and 621. For example, the editor, using the light pen **46*a*, may direct (via the computer 40) the control unit 530 to initiate the storage of a first "take" of a scene on the device 510 and a second "take" of the scene on the device 520**. The method of storing television picture information on rotating magnetic storage media of the type utilized herein is disclosed in an article entitled "Reviewing Slow Motion Disc Principles" which appeared in the February 1969 issue of Broadcast Engineering. In particular, the article describes a suitable technique for applying single frames of television signal on individual circular tracks of memory disc such that still pictures of each frame are obtainable if desired. In the present embodiment, consecutive frames of picture information are recorded on adjacent circular tracks. At regular play or record speeds, a particular read/write head will occupy each circular track for one-thirtieth of a second; i.e., the standard frame duration of a television signal. The disc pack revolution rate of 1800 r.p.m. corresponds to the desired individual revolution time for each frame of one-thirtieth of a second. For slow motion play, a particular reading head will remain on each track for an integral number of revolutions, whereas for "still" play the reading head will remain continuously on the frame being presented.

The signals 512 and 522 which are read out from the disc memories 510 and 520 are fed to signal processing circuits 515 and 525 which decode the composite signals and restore the original separated video, audio, and time code signals. The above referenced Pats. 3,943,674 and 3,423,520 describe the type of circuitry suitable for decoding the previously encoded signals.

The separated video/audio signals 516 and 526 are coupled to an audio video switching unit 556 which, like its counterpart of FIG. 2B, includes separate audio and video switching units similar to those of FIGS. 3A and 3B. In the instant embodiment, however, each crosspoint rangement. For example, the video switching matrix may include means for coupling each of the video outputs to each of the two monitors 68 and 70 on the editor's control chassis. (The additional switching and other circuitry required to implement special effects, such as the "dissolve" described with reference to the prior embodiment, can, of course, be included if desired.) The separated time code signals 517 and 527 are illustrated as being received by a time code switching unit which may be of similar type to that described in FIG. 3C.

The editing operation with the embodiment of FIG. 5 is similar, from the editor's standpoint, to the previously described editing operation with respect to the system of FIG. 2. The rapid access storage medium allows him to work more quickly and efficiently, however. The editor may typically start by viewing a desired portion of takes contained on the storage devices 510 and 520. Thus, for example, using the light pen **46*a* he may issue a command to begin the display on monitor 70 of a region of the take which is recorded on the device 510. Unlike the prior embodiment, no "rewind" command is needed here. The computer 40 generates signals which are translated by the read/write control unit 530 into control signals that are directed to the read/write means 511. The control signals move the reading head carriage directly to the track position at which the first frame of the desired region is recorded and activate the read head on the disc which contains the frame. (It is assumed that the time coded frame addresses of each frame had been previously read into the computer so that the computer "knows" which frame addresses correspond to which physical track and disc locations. This process was described above for the embodiment which utilized helical scan video tape recorders as a storage medium.) As in the prior embodiment, the editor may proceed by still-framing at a chosen point of the viewed region and then issuing a cut command whereby the audio-video switching unit 556 would effectively transfer the frame to the monitor 68. The editor can then typically select a region recorded on the device 520 for display on the monitor 70. At a suitable transition point, the editor can then still-frame the video on the monitor 70** by issuing the appropriate command using the light pen. The frames at the proposed transition point can then be examined side-by-side for artistic quality. If the editor is satisfied, he then issues a cut command which effectively stores his edit decision in the computer.

As was abovedescribed, stored decisions constitute a program of excerpts which can be utilized to form a final assembled program, as in the manner described with reference to FIG. 4. Also, as in the previous embodiment, the computer is preferably programmed to provide a real time rehearse under the editor's control. In the present embodiment, however, the computer issues instructions to the read/write control unit 530 (rather than a transport control unit) to effect the sequential play of the appropriate excerpts. As before, instructions issued by the computer to the switch control unit 85 control the display of the material being read out on the appropriate monitor (and presentation of audio). Also, the addresses of the material being read out can be monitored by the computer via the time code reader 86.

What is claimed is:

1. An editor-controllable system for selecting excerpts from a source of electronic picture information signals and forming a program representative of a sequence of said excerpts, comprising:

means for storing said picture information signals, each frame of said picture information having an address associated therewith;

first and second reading means for simultaneously reading out picture information signals from two editor selected regions of said stored picture information;

first and second display means coupled to said reading means and adapted to simultaneously display to the editor the outputs of said reading means;

editor-controllable switching means coupling said first and second reading means to said first and second display means; and means for sensing and storing the addresses within said two regions corresponding to an editor-selected transition point as between said two regions.

2. An editor-controllable system as defined by claim 1 wherein the addresses corresponding to a plurality of editor-selected transition points are stored in programcerpts from a source of electronic television information signals and forming a program representative of a sequence of said excerpts, comprising:

a plurality of video tape recorders for storing said television information signals in a predetermined order, each frame of the video portion of said information having an associated address code stored therewith;

first and second display means positioned for simultaneous viewing by the editor;

first switching means coupling each of said tape recorders to said first and second display means, and responsive to commands to the editor to couple the video outputs of two editor-selected tape recorders to said first and second display means;

second switching means coupling each of said tape recorders to an output speaker, and responsive to commands from the editor to couple the audio output of an editor-selected tape recorder to said output speaker;

transport control means coupled to each of said video tape recorders and responsive to commands from the editor to transport the tape on editor-selected tape recorders to positions for the readout of editor-selected regions of television information; and means for sensing and storing the address codes corresponding to editor-selected transition points as between regions of said television information.

25. An editor-controllable system as defined by claim 24 further comprising program-operable computing means for storing the codes representative of the editor-selected transition points and for generating digital signals which independently actuate said first and second switching means and said transport control means to effect the playback in real time of the sequence of excerpts constituting the formed program.

26. An editor-controllable system as defined by claim 25 further comprising time code switching means for selectively coupling to the computer the address codes of the television information being presented to the editor.

27. A method of selecting excerpts from a source of electronic picture information signals and forming a program representative of a sequence of said excerpts comprising the steps of:

(a) storing said picture information signals in a predetermined order, each frame of said picture information having an address associated therewith;

(b) simultaneously activating first and second reading means to read out picture information signals from two selected regions of said stored picture information;

(c) simultaneously displaying two selected regions of said stored picture information on a pair of television monitors within simultaneous view;

(d) selecting a suitable transition point as between said two regions;

(e) sensing and storing the addresses within said two regions corresponding the selected transition point;

(f) repeating the steps (b) through (e) desired number of times; and (g) independently activating said first and second reading means to effect the real time readout on a television monitor of the stored picture information corresponding to the stored addresses.

28. The method as defined by claim 27 further comprising the additional step of temporarily still-framing a selected frame within one of the two regions being simultaneously displayed on the monitors before selecting a suitable transition point as between said two regions.

29. The method as defined by claim 28 further comprising the additional step of temporarily still-framing on the other of said monitors a selected frame from the other of said regions before selecting a suitable transition point as between said two regions.

30. An editor-controllable system for selecting excerpts from a source of electronic picture information signals and forming a program representative of a sequence of said excerpts, comprising:

means for storing said picture information signals, each frame of said picture information having an address associated therewith;

first and second reading means for reading out picture information signals from editor-selected regions of said stored picture information;

display means coupled to said reading means for displaying to the editor the output of said reading means;

editor-controllable switching means coupling each of said reading means to said display means;

program operable computing means for sensing and storing the addresses coresponding to a plurality of editor-selected transition points, said computing means generating digital signals which are a function of said addresses; and control circuit means responsive to said digital signals for independently actuating said first and second reading means to read out in real time from said storage means the sequence of excerpts constituting the formed program.

31. An editor-controllable system as defined by claim 30 wherein said control circuit means includes means for controlling said first and second reading means and means for controlling said switching means.

References Cited

UNITED STATES PATENTS

| | | | |
|---|---|---|---|
| 3,364,306 | 1/1968 | Brown | 179—100.2 B |
| 2,927,154 | 3/1960 | Wolfe | 178—6.6 A |
| 3,614,333 | 10/1971 | Iwata | 178—6.6 D D |
| 3,358,080 | 12/1967 | MacLeod | 178—6.6 A |
| 3,123,668 | 3/1964 | Silva | 178—100.2 B |

HOWARD W. BRITTON, Primary Examiner

U.S. Cl. X.R.

178—DIG. 6; 179—100.2 B